(12) United States Patent
Shemkunas et al.

(10) Patent No.: US 12,194,559 B2
(45) Date of Patent: Jan. 14, 2025

(54) METHOD OF WELDING A WORKPIECE ASSEMBLY

(71) Applicant: The Boeing Company, Chicago, IL (US)

(72) Inventors: Michael P. Shemkunas, Mukilteo, WA (US); Gary W. Coleman, Snohomish, WA (US); Ryan J. Glamm, Kent, WA (US); Gregory E. Trepus, Enumclaw, WA (US); Chul Y. Park, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 616 days.

(21) Appl. No.: 17/447,683

(22) Filed: Sep. 14, 2021

(65) Prior Publication Data

US 2023/0082207 A1    Mar. 16, 2023

(51) Int. Cl.
*B23K 10/02* (2006.01)
*B23K 37/04* (2006.01)

(52) U.S. Cl.
CPC .......... *B23K 10/02* (2013.01); *B23K 37/0426* (2013.01)

(58) Field of Classification Search
CPC .............................. B23K 10/02; B23K 37/0426
See application file for complete search history.

(56) References Cited

U.S. PATENT DOCUMENTS

| | | | | |
|---|---|---|---|---|
| 2014/0294490 | A1* | 10/2014 | Lin | B23K 15/004 219/136 |
| 2016/0368078 | A1* | 12/2016 | Wilkosz | B23K 26/60 |
| 2019/0358735 | A1* | 11/2019 | Kronthaler | B23K 26/0676 |
| 2021/0046577 | A1* | 2/2021 | Ehling | B23K 11/163 |

FOREIGN PATENT DOCUMENTS

JP    2001150141 A   *  6/2001

OTHER PUBLICATIONS

Wikipedia, Plasma Arc Welding, retried on xxx Aug. 29, 2021.

* cited by examiner

*Primary Examiner* — Nathaniel E Wiehe
*Assistant Examiner* — Dilnessa B Belay

(57) ABSTRACT

A method of welding a workpiece assembly includes positioning a flange adjacent to a web to form a workpiece assembly having an interface between a flange edge surface and a web side surface, and in which a web edge portion protrudes beyond a flange front surface on a front side of the workpiece assembly. The method additionally includes constraining the flange and the web against movement, and moving a plasma arc welding (PAW) torch, located on the front side of the workpiece assembly, along a lengthwise direction of the interface, while causing a plasma arc to pass through a flange edge portion and the web side surface, and generate molten material that joins the flange to the web.

20 Claims, 27 Drawing Sheets

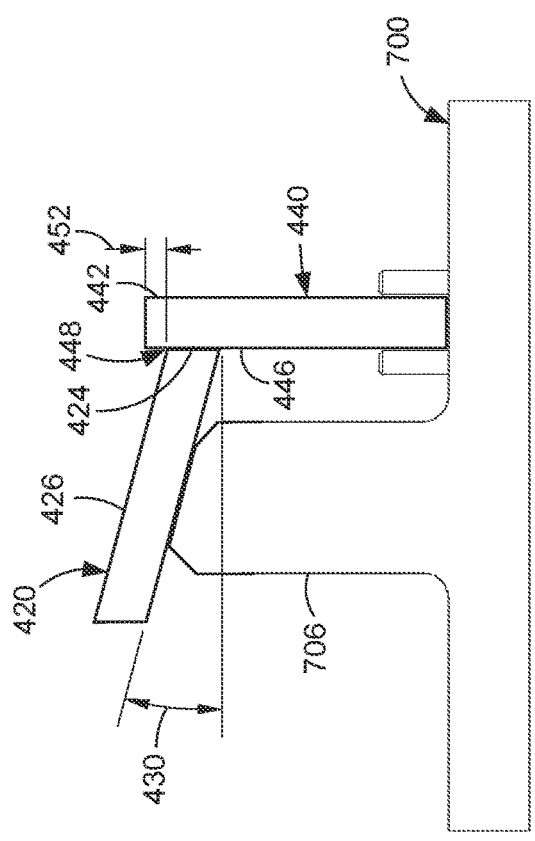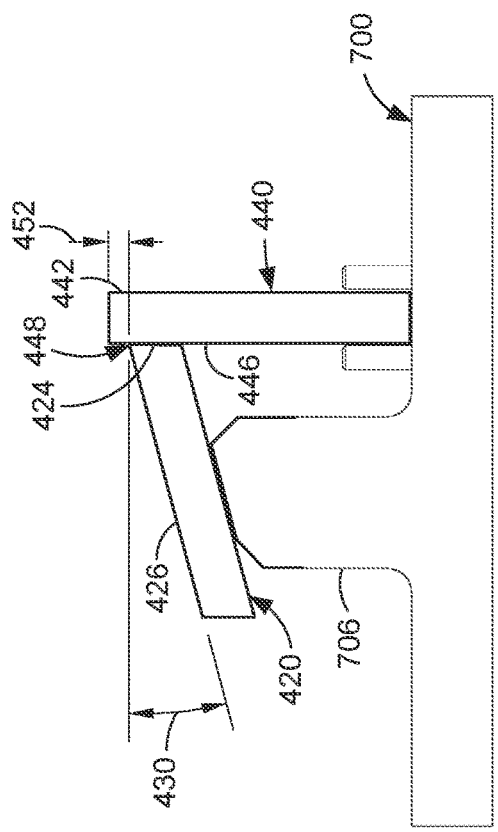

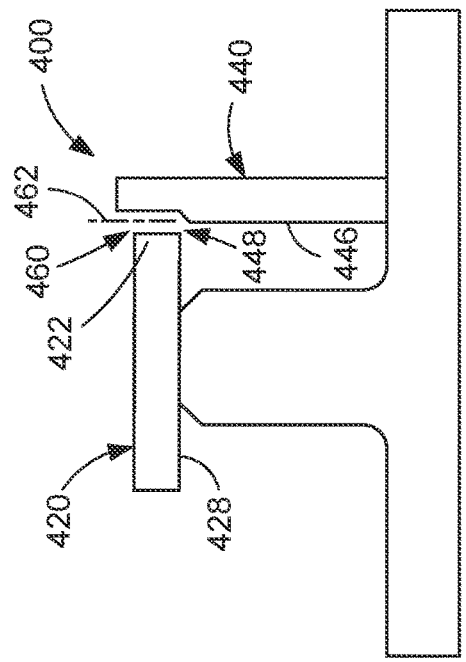
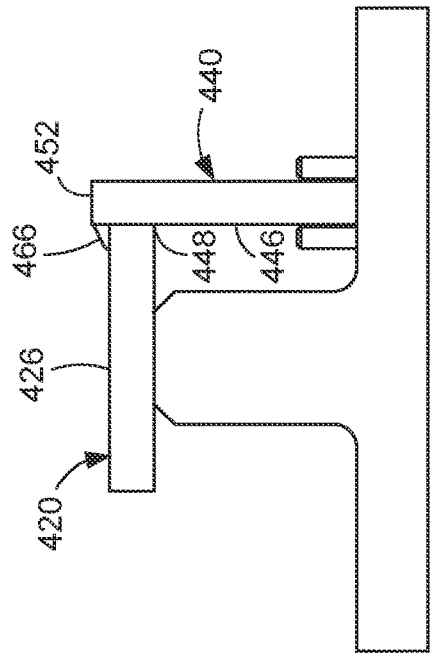
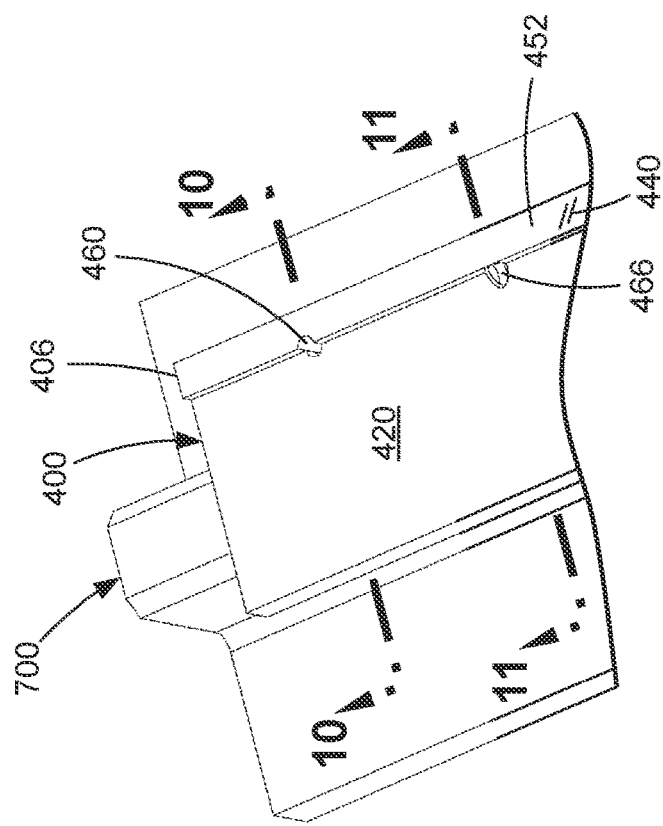

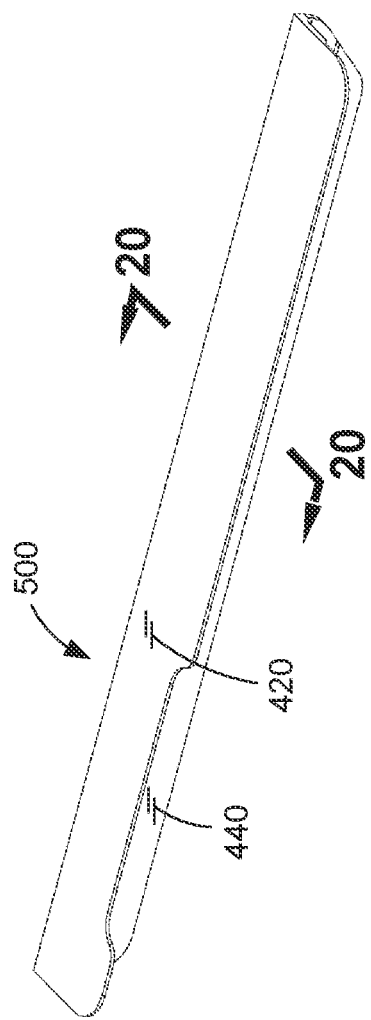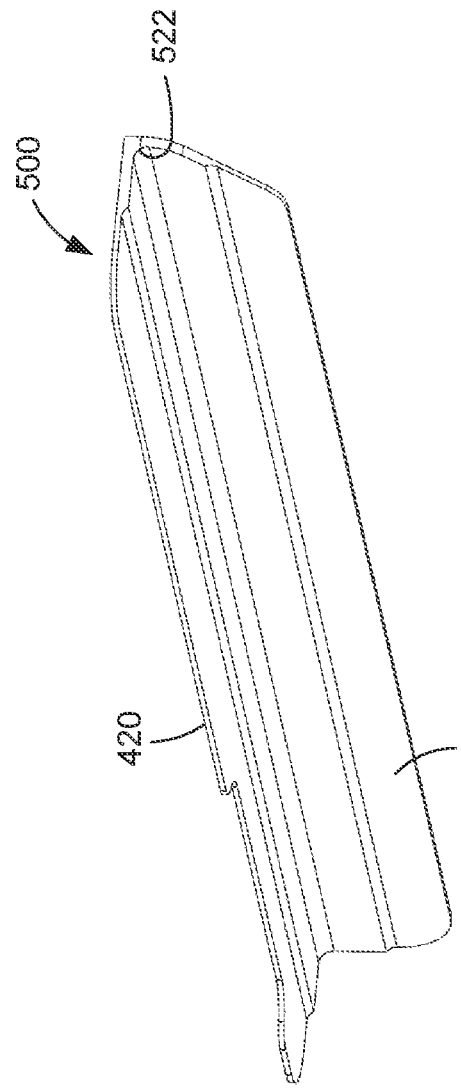

METHOD OF WELDING A WORKPIECE ASSEMBLY

FIELD

The present disclosure relates generally to welding processes and, more specifically, to a method of welding a workpiece assembly using plasma arc welding.

BACKGROUND

Structural beams are used in a variety of applications and may be provided in a variety of cross-sectional shapes or configurations. For example, a beam with an L-shaped configuration includes a web and a flange oriented perpendicular to each other. A beam with a T-shaped configuration includes a pair of flanges, and a web oriented perpendicular to the flanges.

One method of producing a beam with an L-shaped configuration or a T-shaped configuration involves machining the beam out of a solid billet of metallic material. Unfortunately, billets are expensive and typically have long lead times. In addition, the process of machining a billet is time-consuming, and results in a significant amount of material waste.

As can be seen, there exists a need in the art for a method of forming beams in a cost-effective and timely manner.

SUMMARY

The above-noted needs associated with forming beams are addressed by the present disclosure, which provides a method of welding a workpiece assembly into a near-net shape that can be machined into a beam. The method includes positioning a flange adjacent to a web to form a workpiece assembly having an L-shaped configuration. The workpiece assembly has an interface between a flange edge surface and a web side surface, and a web edge portion protrudes beyond a flange front surface on a front side of the workpiece assembly. The method additionally includes constraining the flange and the web against movement, and moving a plasma arc welding (PAW) torch, located on the front side of the workpiece assembly, along a lengthwise direction of the interface, while causing a plasma arc to pass through a flange edge portion and the web side surface, and generate molten material that joins the flange to the web.

In another example, disclosed is a method of welding a workpiece assembly, comprising the steps of positioning a web between two flanges to form a workpiece assembly having a T-shaped configuration having an interface on each side of the web between a flange edge surface and a web side surface, and in which a web edge portion protrudes beyond a flange front surface of each flange on a front side of the workpiece assembly. The method includes constraining the flanges and the web against movement. In addition, the method includes moving, for each interface, a plasma arc welding (PAW) torch, located on the front side of the workpiece assembly, along a lengthwise direction of the interface while causing a plasma arc to pass through a flange edge portion and the web side surface, and generate molten material that is deposited on a back side of the workpiece assembly, forming a back side fillet between a flange back surface and the web side surface, thereby joining each flange to the web.

In a still further example, disclosed is a method of welding a workpiece assembly, comprising the steps of supporting a web and two flanges on a welding fixture, in a manner such that the web and flanges form a workpiece assembly having a T-shaped configuration in which a flange edge surface of each flange is positioned adjacent to, and forms an interface with, one of opposing web side surfaces of the web, and such that a web edge portion of the web protrudes beyond a flange front surface of each flange on a front side of the workpiece assembly. The method also includes forming, for each interface, a keyhole proximate an end of the workpiece assembly such that a portion of the keyhole extends through the flange, and a remaining portion of the keyhole extends into the web side surface. The method additionally includes welding each flange to the web by performing the following: (1) positioning a plasma arc welding (PAW) torch on the front side of the workpiece assembly, and generating a plasma arc that extends into the keyhole; and (2) moving the PAW torch along a lengthwise direction of the interface while causing the plasma arc to pass through a flange edge portion and the web side surface, and generate molten material that is deposited on a back side of the workpiece assembly, forming a back side fillet between a flange back surface and the web side surface, thereby joining each flange to the web.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 6 is an end view of an example of a workpiece assembly in which the flange is oriented non-perpendicular to the web;

FIG. 7 is an end view of a further example of a workpiece assembly in which the flange is non-perpendicular to the web;

FIG. 9 is a magnified view of the portion of the workpiece assembly of FIG. 8 identified by reference numeral 9, and illustrating the keyhole centered on the interface between the flange and the web, and further illustrating one of the tack welds for fixing the flange and web in position relative to each other during welding;

FIG. 10 is a sectional view taken along line 10-10 of FIG. 9, and illustrating the keyhole centered on the interface between the flange and the web;

FIG. 11 is a sectional view taken along line 11-11 of FIG. 9, and illustrating one of the tack welds holding the flange and web in position relative to each other;

FIG. 18 is a top perspective view of an example of the welded assembly of FIGS. 16-17 after machining to result in a machined part;

FIG. 19 is a bottom perspective view of the machined part of FIG. 18;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and fully convey the scope of the disclosure to those skilled in the art.

This specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional materials, structures, or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational.

As used herein, an element or step recited in the singular and preceded by the word "a" or "an" should be understood as not necessarily excluding the plural of the elements or steps.

Figure 1:
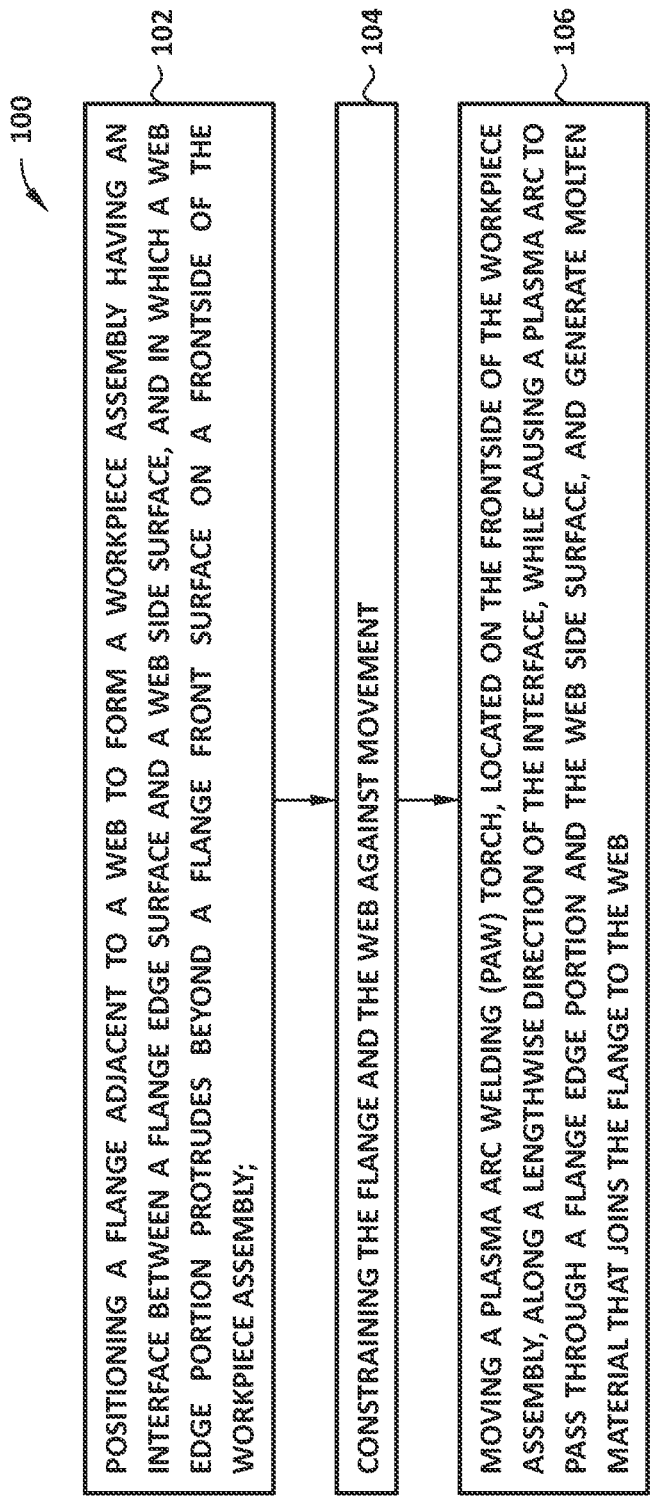
FIG. 1 is a flowchart of operations included in a method of welding a workpiece assembly having an L-shaped configuration.
Figure 2:
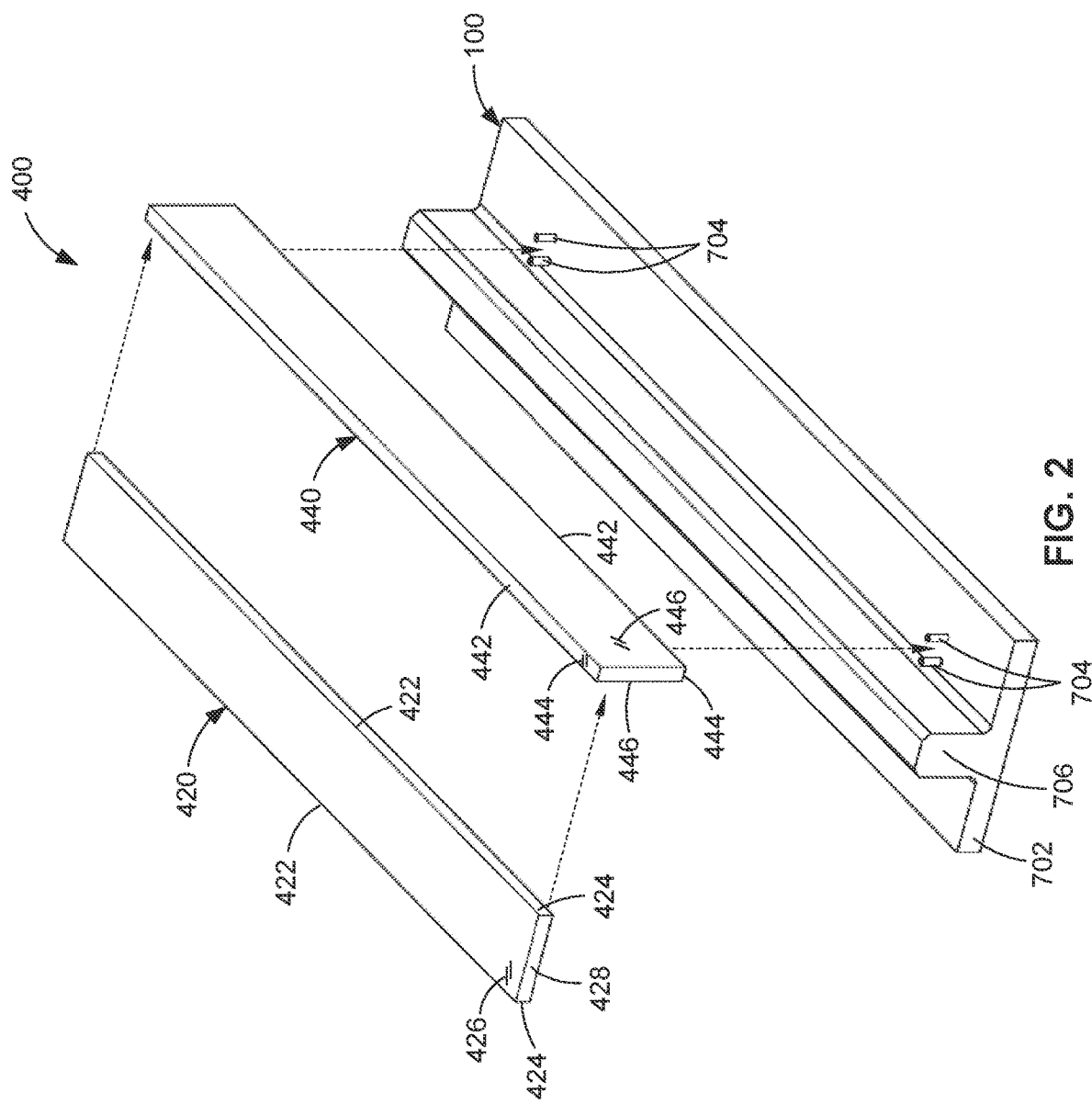
FIG. 2 is an exploded view of a flange and a web, prior to mounting on a welding fixture.

Referring now to the drawings which illustrate preferred and various examples of the disclosure, shown in FIG. 1 is a flowchart of steps included in a method 100 of welding a workpiece assembly 400 using a plasma arc welding (PAW) torch 600 (e.g., FIG. 13) of a PAW apparatus (not shown). As described below, the method 100 results in a welded assembly 500 (e.g., FIGS. 16-17) that is machinable into a machined part 520 (e.g., FIGS. 18-20), and which may take the form of a structural beam. In the example of FIG. 2, the workpiece assembly 400 includes a web 440 and a flange 420, both of which are shown as straight elongate members of equal length. The web 440 has opposing web side surfaces 446 that are each bounded by opposing web edge surfaces 444. Each web edge surface 444 is part of a web edge portion 442 that extends along the length of the web 440. The flange 420 has a flange front surface 426 and a flange back surface 428 that are each bounded by opposing flange edge surfaces 424. Each flange edge surface 424 is part of a flange edge portion 422 that extends along the length of the flange 420.

The flange 420 and the web 440 are comprised of metallic material. For example, the flange 420 and the web 440 may be formed of aluminum, steel, titanium, or other materials or alloys. In this regard, the presently-disclosed methods 100, 200, 300 are applicable to any metallic material, and are not limited to aluminum, steel, and titanium, or combinations thereof. For welding titanium and certain other metals, the welding process is autogenous, meaning that no filler metal is added during the welding process. However, for welding aluminum and certain other metals, filler metal (not shown) may be added to form a weld joint between the flange 420 and the web 440 as the PAW torch 600 (FIG. 13) is moved along an interface 448 (e.g., FIGS. 3-5) between the flange 420 and the web 440.

Figure 20:
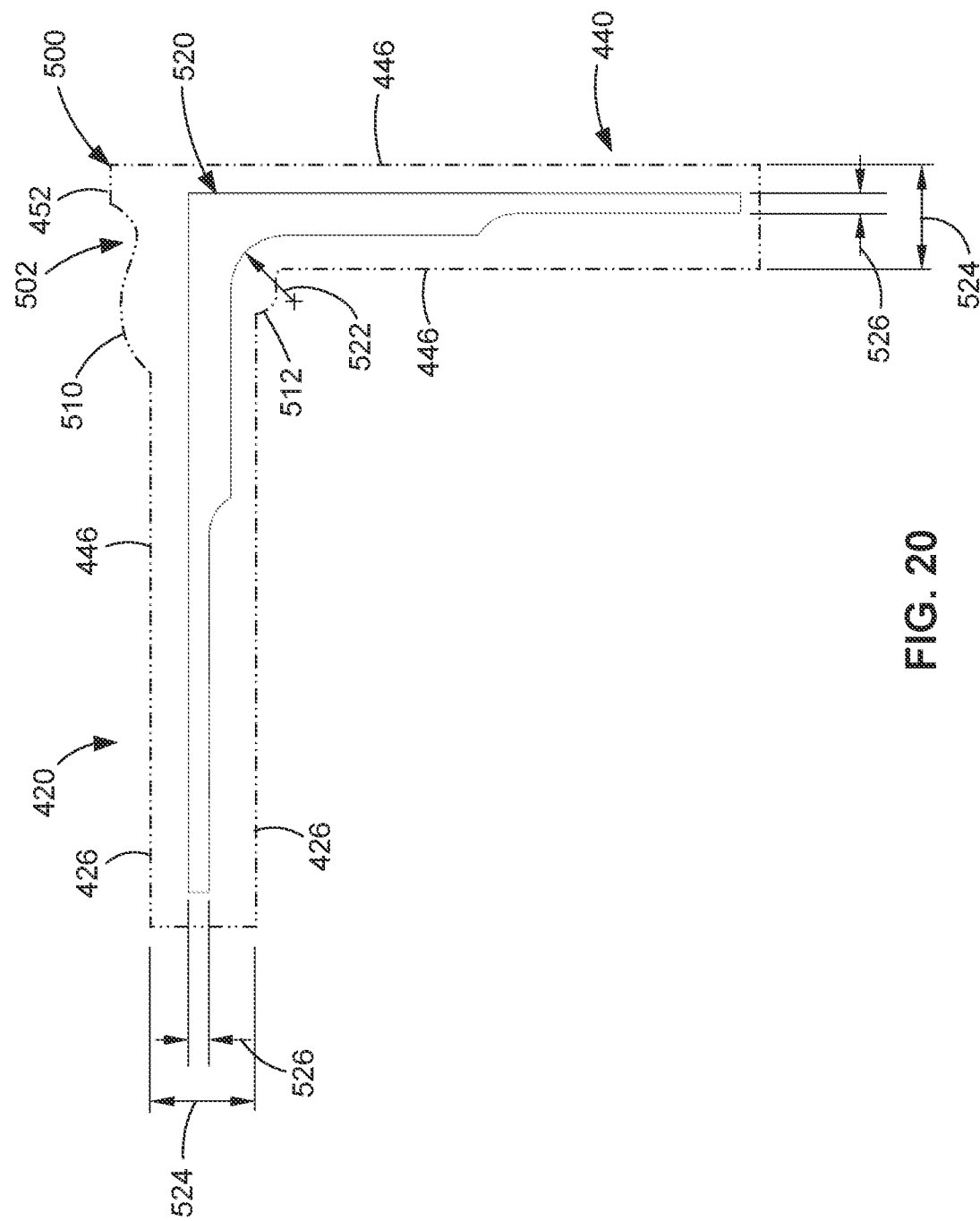
FIG. 20 is a sectional view taken along line 20-20 of FIG. 18, and illustrating the final thicknesses of the flange and web after machining of the welded assembly.

The flange 420 and the web 440 are provided in any one of a variety of initial thicknesses 524 (FIG. 20). For example, the flange 420 has an initial thickness 524 that ranges from 0.050 inch up to 1.0 inch or more. The web 440 has an initial thickness 524 that allows the web edge portion 442 to serve as filler material for a back side fillet 512 that is formed using the presently-disclosed method 100, as described in greater detail below. In one example, the web 440 has an initial thickness 524 of from 0.25 inch to 1.0 inch or more.

Advantageously, the flange 420 and the web 440 may be comprised of readily-available and comparably low-cost, off-the-shelf material. For example, the flange 420 and the web 440 may each be provided as constant-thickness plate stock in any one of a variety of standardized thicknesses. In the example shown, the initial thickness 524 of the flange 420 and the web 440 is constant along their respective lengths. However, in other examples not shown, the flange 420 and/or the web 440 may be of non-constant thicknesses, and/or the flange 420 and/or the web 440 may be non-planar or slightly curved along their lengthwise directions. After being welded together to form a welded assembly 500 using the method 100, the flange 420 and the web 440 may be machined to a final thickness 526 (e.g., FIG. 20) to thereby formed a machined part 520 (FIGS. 18-20), as described below.

Figure 3:
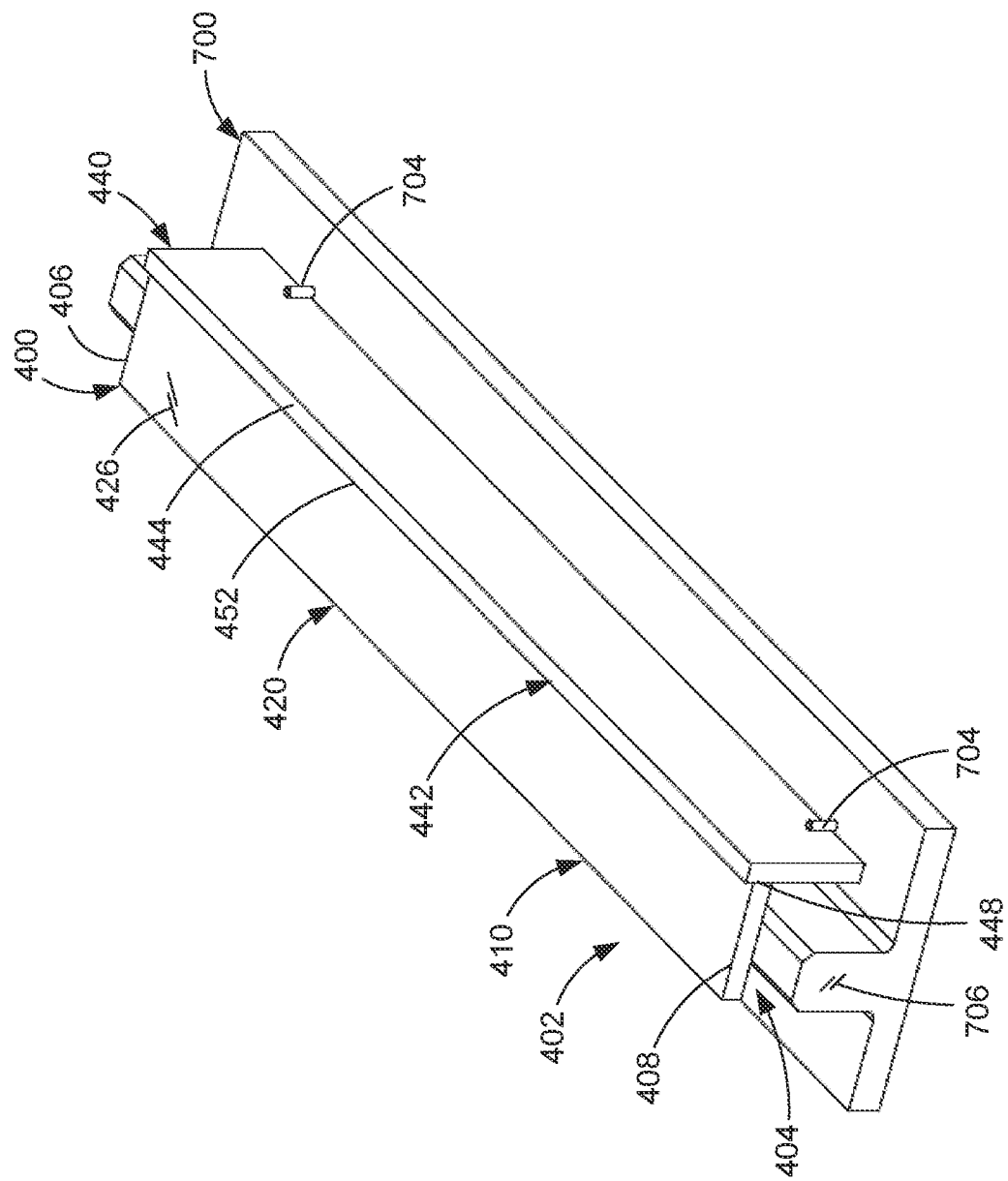
FIG. 3 is a perspective view of the flange positioned adjacent to the web to form a workpiece assembly having an L-shaped configuration, which is shown supported on the welding fixture.
Figure 4:
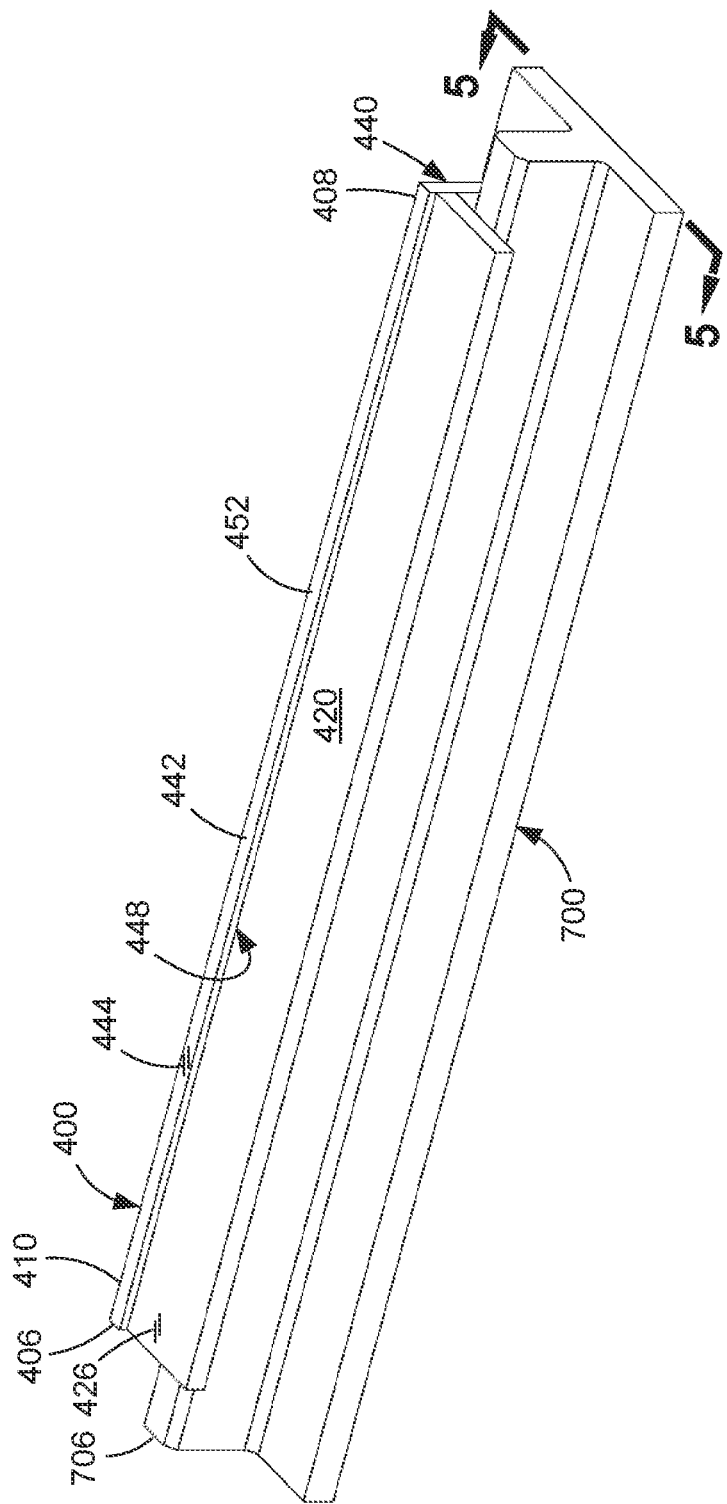
FIG. 4 is a further perspective view of the workpiece mounted on the welding fixture.
Figure 5:
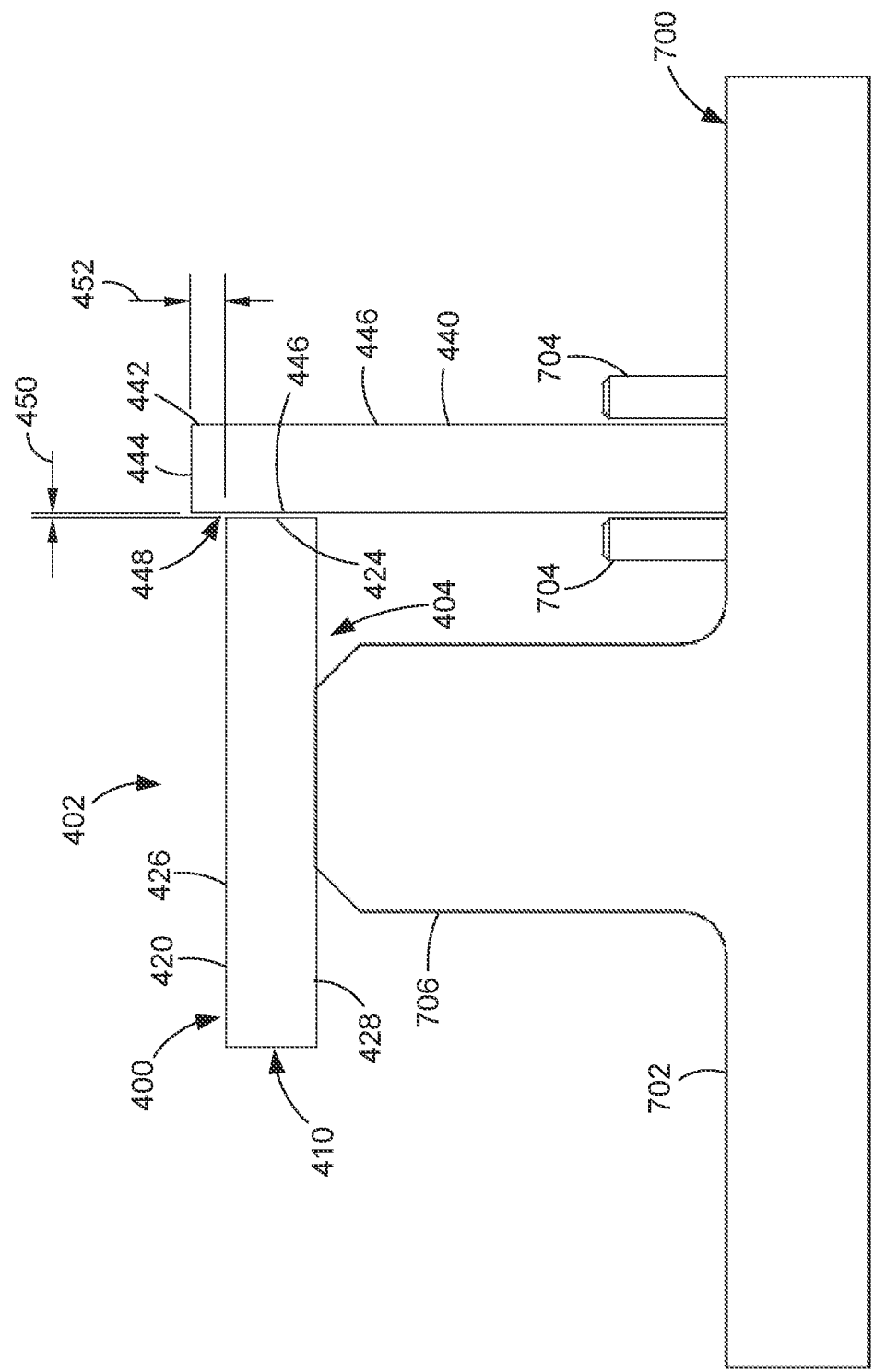
FIG. 5 is an end view of the workpiece assembly and welding fixture of FIG. 4, and illustrating the web positioned such that a web edge portion protrudes above the level of the flange.

Referring to FIGS. 2-5, step 102 of the method 100 includes positioning the flange 420 adjacent to the web 440 to form a workpiece assembly 400 in a pre-joined state. The workpiece assembly 400 has a first end 406 and a second end 408. In FIGS. 3-5, the flange 420 and the web 440 are supported on a welding fixture 700. In the example shown, the welding fixture 700 has a flange table 706, and a set of pins 704 extending upwardly from a base 702. The set of pins 704 locate and/or orient the web 440 which, in the example shown, is oriented vertically on the welding fixture 700. The flange table 706 provides the surface upon which the flange 420 rests. Although shown in FIGS. 2-5 as having a flange table 706 and a plurality of pins 704, the welding fixture 700 may be provided in any one of a variety of alternative configurations for supporting the flange 420 and web 440, and is not limited to the configuration shown.

As shown in FIGS. 3-5, the workpiece assembly 400 has an L-shaped configuration 410 when supported on the welding fixture 700. As shown in FIG. 5, an interface 448 is defined between the flange edge surface 424 and the web side surface 446. In one example, the flange edge surface 424 is in abutting contact with the web side surface 446 along the length of the interface 448. In this regard, step 102 of positioning the flange 420 adjacent to the web 440 comprises positioning the flange 420 such that, along the length of the interface 448, the flange edge surface 424 and the web side surface 446 define a gap 450 of no more than 0.040 inch. However, in other examples, the workpiece assembly 400 may include a gap 450 of greater than 0.040 inch between the flange edge surface 424 and the web side surface 446.

Referring still to FIGS. 3-5, the flange 420 is positioned adjacent to the web 440 such that the web edge portion 442 protrudes beyond or above the flange front surface 426 on the front side 402 of the workpiece assembly 400. The portion of the web 440 protruding above the flange front surface 426 is referred to as the web protrusion 452. In the present method 100, step 102 comprises positioning the web 440 such that the web edge surface 444 of the web protrusion 452 is no more than 0.10 inch above or beyond the level of the flange front surface 426 at the location of the interface 448. In another example, the web 440 is positioned such that the web protrusion 452 is no more 0.080 inch above the flange front surface 426 at the location of the interface 448. In the example shown, the height of the web protrusion 452 above the flange front surface 426 is dictated in part by the geometry of the welding fixture 700 (e.g., the height of the flange table 706), the initial thickness 524 (FIG. 20) of the flange 420, and/or the width of the web 440 (i.e., the distance between the web edge surfaces 444).

In the example of FIGS. 3-5, the flange 420 is oriented perpendicular to the web 440 when positioned on the welding fixture 700. However, in other examples such as in FIGS. 6-7, the flange 420 is oriented non-perpendicular to the web 440. In this regard, step 102 of positioning the flange 420 adjacent to the web 440 may comprise orienting the flange 420 such that the flange angle 430 of the flange front surface 426 is within 45 degrees of perpendicular to the web side surface 446. In the example of FIGS. 6-7, the flange table 706 is configured to support the flange 420 at a non-perpendicular flange angle 430. The welding fixture 700 may include mechanisms (not shown) for preventing the flange 420 from sliding off of the flange table 706. Despite being oriented non-perpendicular to the web side surface 446, the flange edge surface 424 nearest the web 440 is preferably parallel (e.g., to within 20 degrees) to the web side surface 446 along the interface 448. Regardless of the flange angle 430, the flange 420 is positioned adjacent to the web 440 in a manner such that the web edge portion 442 protrudes beyond or above the flange front surface 426, as shown by the web protrusion 452 in FIGS. 6-7.

Referring to FIGS. 2-5 and 8-11, step 104 of the method 100 includes constraining the flange 420 and the web 440 against movement during welding. In this regard, step 104 of constraining the flange 420 and the web 440 against movement comprises supporting the workpiece assembly 400 in a welding fixture 700 in a manner preventing movement of the flange 420 and the web 440. As mentioned above, the welding fixture 700 may include one or more mechanisms (not shown) such as clamps (not shown) for constraining the flange 420 and the web 440 against movement.

Figure 8:
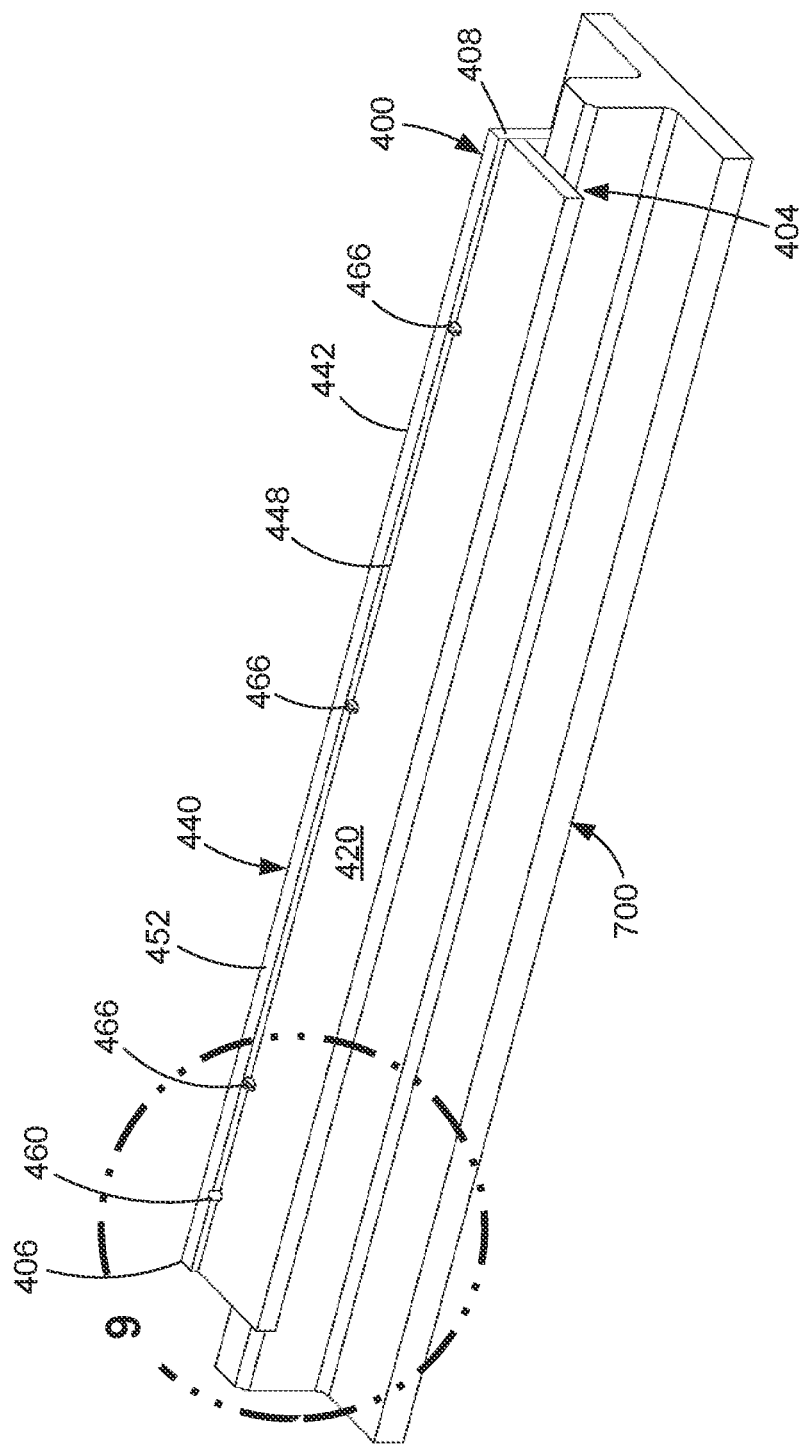
FIG. 8 shows the workpiece assembly of FIGS. 3-5 in which the flange is tack welded to the web, and further illustrating a keyhole formed at one end of the workpiece assembly.
Figure 12:
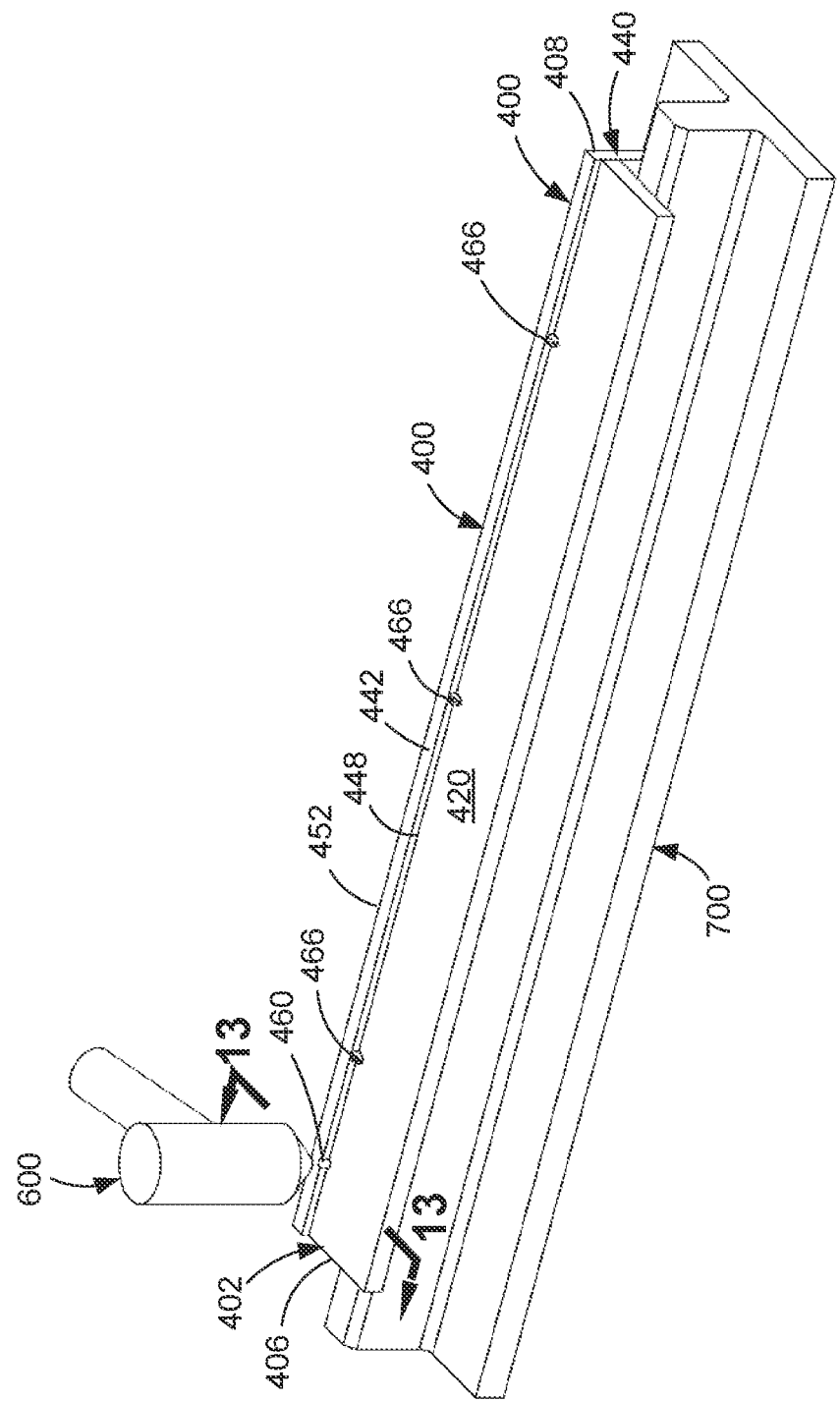
FIG. 12 is a perspective view of the workpiece assembly showing a plasma arc welding (PAW) torch centered on the keyhole.

Referring to FIGS. 8-9 and 11, step 104 of constraining the flange 420 and the web 440 against movement may comprise tack welding the flange 420 to the web 440 at one or more locations along the interface 448, to thereby prevent movement of the flange 420 relative to the web 440. In the example shown, the flange 420 is fixed to the web 440 via three tack welds 466 at spaced intervals along the interface 448 on the front side 402 of the workpiece assembly 400. However, any number of tack welds 466, including a single tack weld 466, may be applied to the workpiece assembly 400 as a means to fix the flange 420 to the web 440. The tack welds 466 are of relatively small size (e.g., less than 0.50 inch diameter), and are configured to fix the position and orientation (i.e., the flange angle 430) of the flange 420 relative to the web 440. Tack welds 466 may also be applied at other locations along the workpiece assembly 400, such as along the back side 404 of the workpiece assembly 400, or on the first end 406 and/or second end 408 of the workpiece assembly 400. Tack welds 466 may be applied using a PAW torch 600, or by using other welding techniques such as via gas tungsten arc welding (GTAW), or gas metal arc welding (GMAW).

Referring to FIGS. 8-10 and 12-15, in some examples, the method 100 comprises forming a keyhole 460 on the interface 448 of the workpiece assembly 400, and starting the PAW torch 600 movement along the interface 448, with the plasma arc 614 (FIG. 13) initially inside the keyhole 460. Preferably, the keyhole 460 is located proximate the first end 406 and/or the second end 408 of the workpiece assembly 400. For example, the workpiece assembly 400 may include a keyhole 460 located less than 2 inches from the first end 406 of the workpiece assembly 400, or less than 2 inches from the second end 408 of the workpiece assembly 400.

As shown in FIG. 10, the keyhole centerline 462 is preferably oriented parallel to the web side surface 446. Preferably, the keyhole 460 is centered (e.g., +/−0.050 inch) on the interface 448, and is evenly divided between the flange 420 and the web 440. In this regard, a portion of the keyhole 460 extends into the flange 420, and the remaining portion of the keyhole 460 extends into the web side surface 446. More specifically, the keyhole 460 is formed in the workpiece assembly 400 such that one semi-cylindrical portion of the keyhole 460 is located on the flange edge portion 422, and the other semi-cylindrical portion of the keyhole 460 extends in parallel relation through the web side surface 446.

The step of forming the keyhole 460 comprises forming (e.g., drilling) the keyhole 460 at a diameter of between 0.25 to 0.5 inch. However, the keyhole diameter may be dictated in part by the initial thickness 524 of the flange 420. For example, a flange 420 that has a large initial thickness 524 may dictate a larger keyhole 460 diameter that a flange 420 that has a smaller initial thickness 524. The depth of the keyhole 460 may be such that the full diameter of the keyhole 460 extends completely through the thickness of the flange 420, and the bottom of the full diameter of the keyhole 460 stops at the flange back surface 428 (FIG. 10), as shown in FIG. 10. A keyhole 460 may not be required for workpiece assemblies in which the initial thickness 524 of the flange 420 is less than 0.090 inch. For such arrangements, the plasma arc 614 may be capable of melting a hole through the flange 420 and partially into the web side surface 446 to initiate the welding process.

Figure 13:
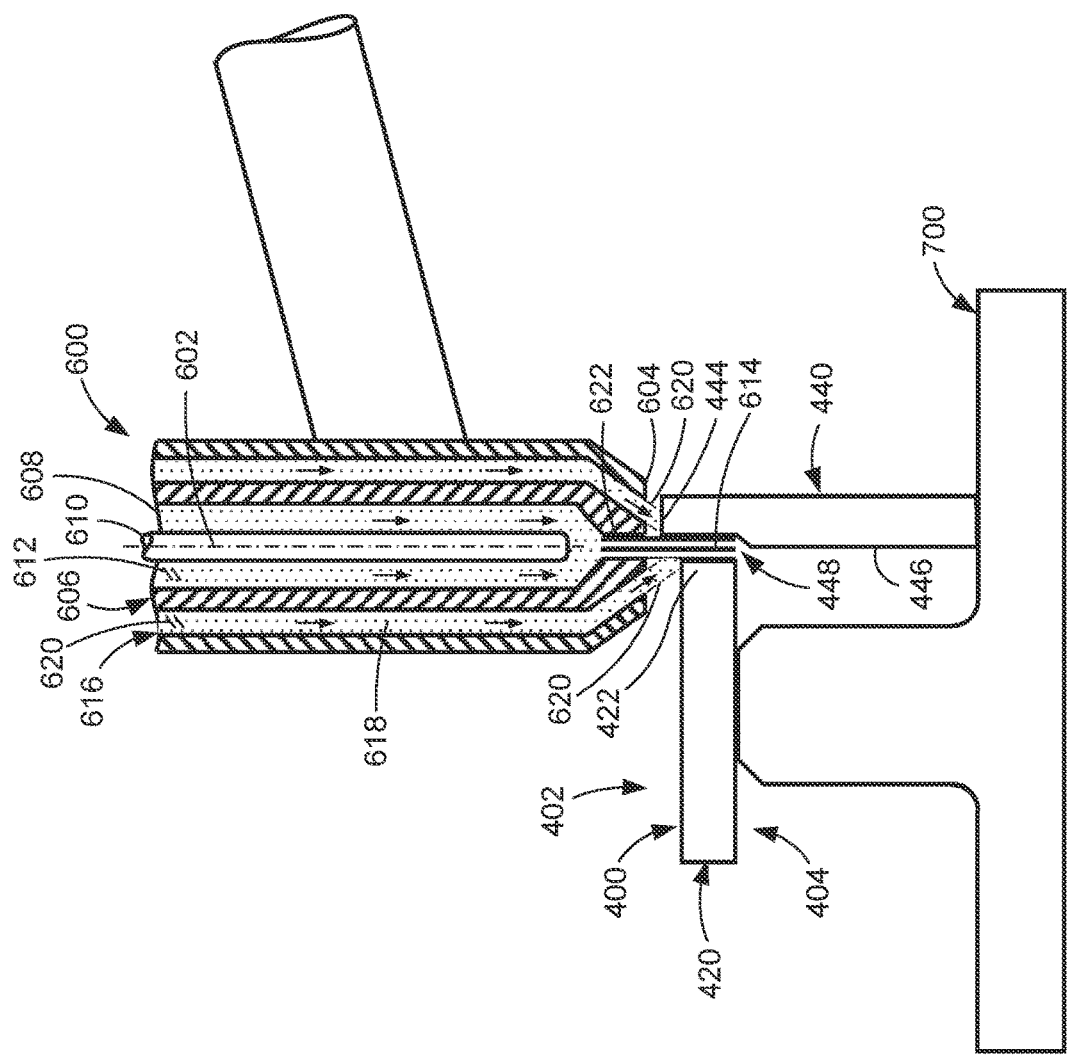
FIG. 13 is a sectional view taken along line 13-13 of FIG. 12, and illustrating an example of the PAW torch.
Figure 14:
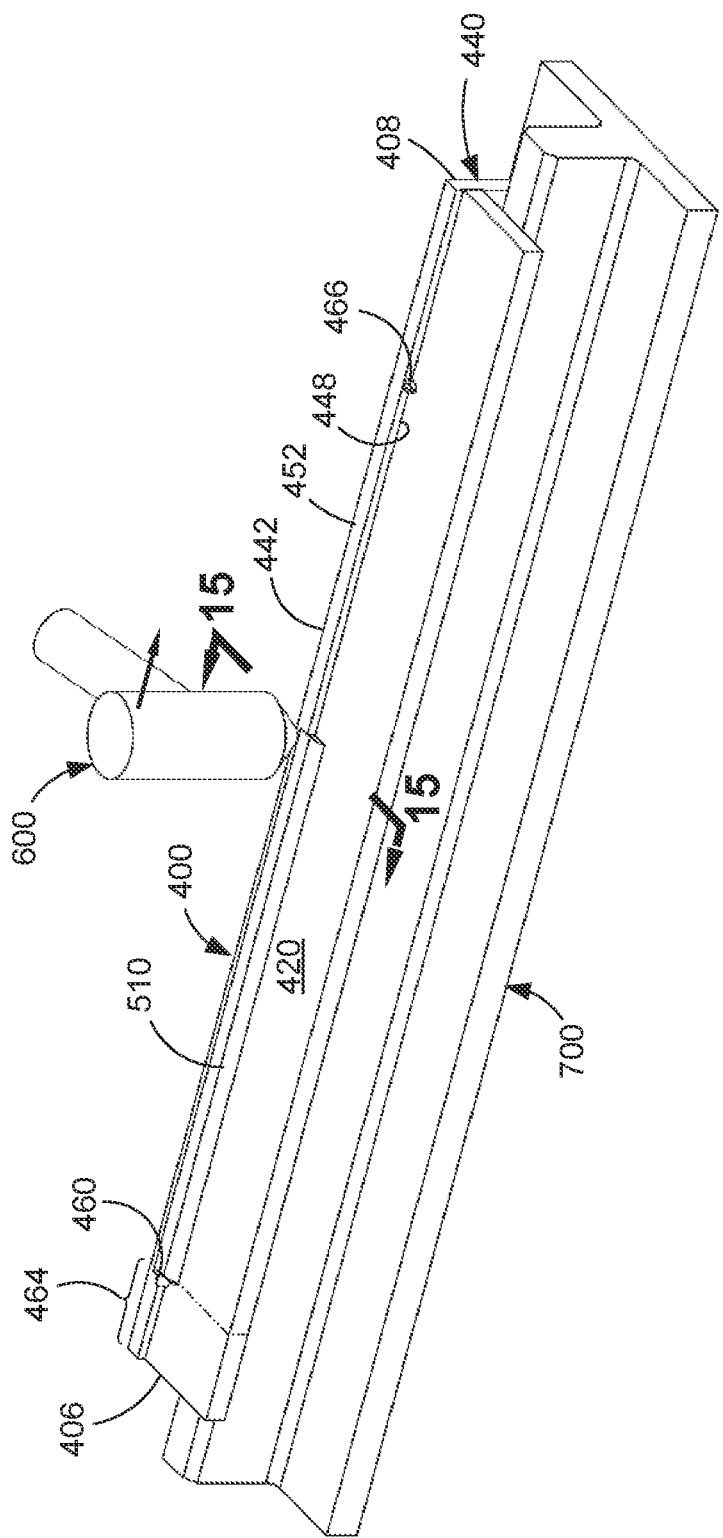
FIG. 14 is a perspective view of the workpiece assembly showing the PAW torch moving along a lengthwise direction of the interface during welding of the flange to the web.
Figure 17:
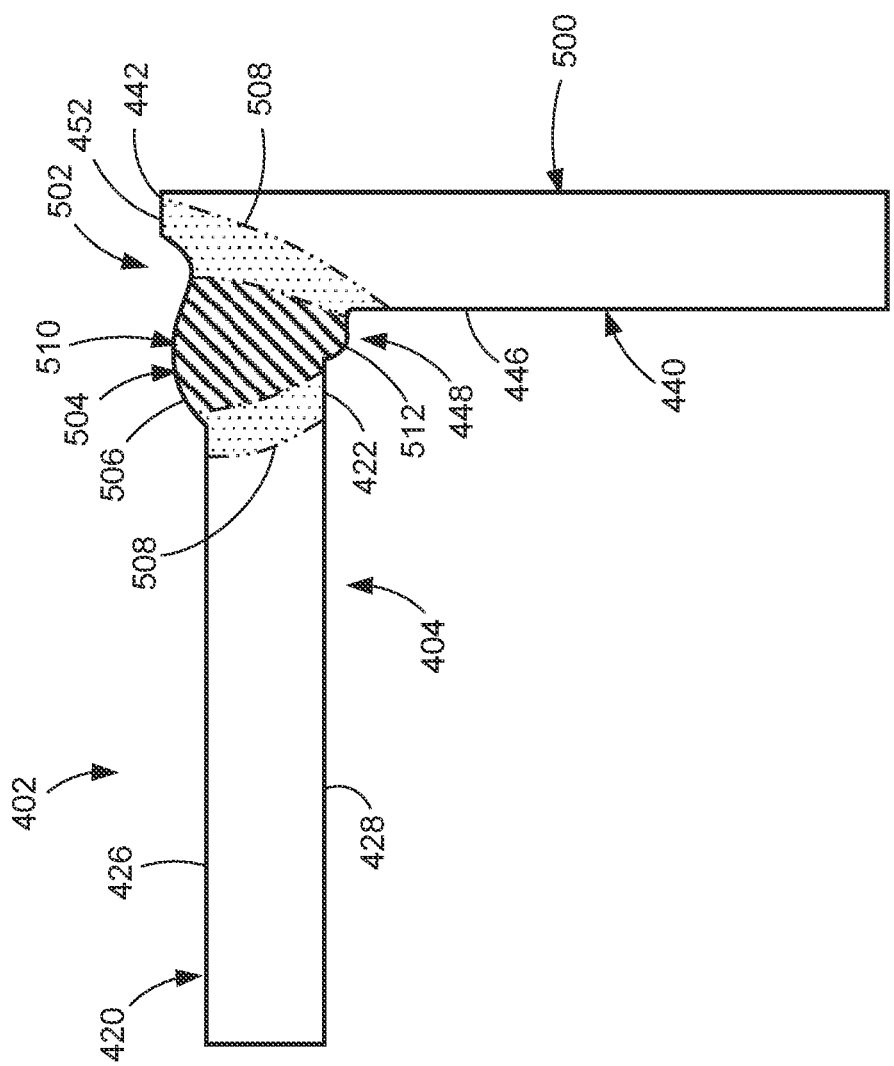
FIG. 17 is a sectional view taken along line 17-17 of FIG. 16, and illustrating the weld nugget joining the flange to the web at the interface of the welded assembly.

Referring to FIGS. 12-15, step 106 of the method 100 includes moving the PAW torch 600, located on the front side 402 of the workpiece assembly 400, along a lengthwise direction of the interface 448. FIG. 13 is a cross-sectional view of an example of a PAW torch 600. In the example shown, the PAW torch 600 includes a constricting nozzle 606 concentrically located within a shielding gas nozzle 616. The constricting nozzle 606 includes a plenum chamber 608 housing a non-consumable electrode 610. The electrode 610 may be formed of tungsten or other material, and is centrally located within the plenum chamber 608. The PAW apparatus (not shown) is configured to form an electric arc between the electrode 610 and the workpiece assembly 400. Orifice gas 612 flows through the plenum chamber 608 and out of the nozzle orifice 622 of the constricting nozzle 606. The orifice gas 612 is an inert gas such as argon, helium, mixtures of argon and helium, or mixtures of argon and hydrogen. The nozzle orifice 622 constricts the orifice gas 612, which is ionized by the electric arc between the electrode 610 and the workpiece assembly 400, causing the plasma arc 614 to exit the nozzle orifice 622 as a high-velocity, high-temperature stream. As described below, the plasma arc 614 impinges on the web side surface 446 and on the flange edge portion 422, and thereby generates molten material that is deposited on the back side 404 of the workpiece assembly 400 to form the back side fillet 512 (FIG. 17).

Referring still to FIG. 13, as the plasma arc 614 exits the nozzle orifice 622, an inert shielding gas 620 (e.g., argon, helium) flows through an annular shielding gas chamber 618 between the constricting nozzle 606 and the shielding gas nozzle 616, and exits the torch tip 604. After exiting the torch tip 604, the shielding gas 620 surrounds the plasma arc 614, and thereby protects the molten material from exposure to the atmosphere, which would otherwise cause oxidation that would reduce the quality of the weld joint between the flange 420 and the web 440. The torch tip 604 is maintained at a torch standoff distance from the web edge surface 444. The plasma arc 614 passes from the front side 402 of the workpiece assembly 400, to the back side 404 of the workpiece assembly 400. The manner in which the plasma arc 614 generates molten material from the flange 420 and web 440 may be controlled by controlling the torch standoff distance, the travel speed of the PAW torch 600, and/or the voltage level of the PAW torch 600.

Referring to FIGS. 12-15, the PAW torch 600 is moved generally from the first end 406 (e.g., from the keyhole 460) toward the second end 408 of the workpiece assembly 400. The PAW torch 600 is either hand-held and manually moved, or the PAW torch 600 is moved in an automated manner using a mechanical device, such as a robotic arm of a robotic device (not shown). As the PAW torch 600 is moved along the length of the interface 448, step 106 of the method 100 includes centering the torch axis 602 (FIG. 13) on the interface 448. Step 106 may additionally include maintaining the torch axis 602 approximately parallel (e.g., within 10 degrees) to the web side surface 446.

Figure 15:
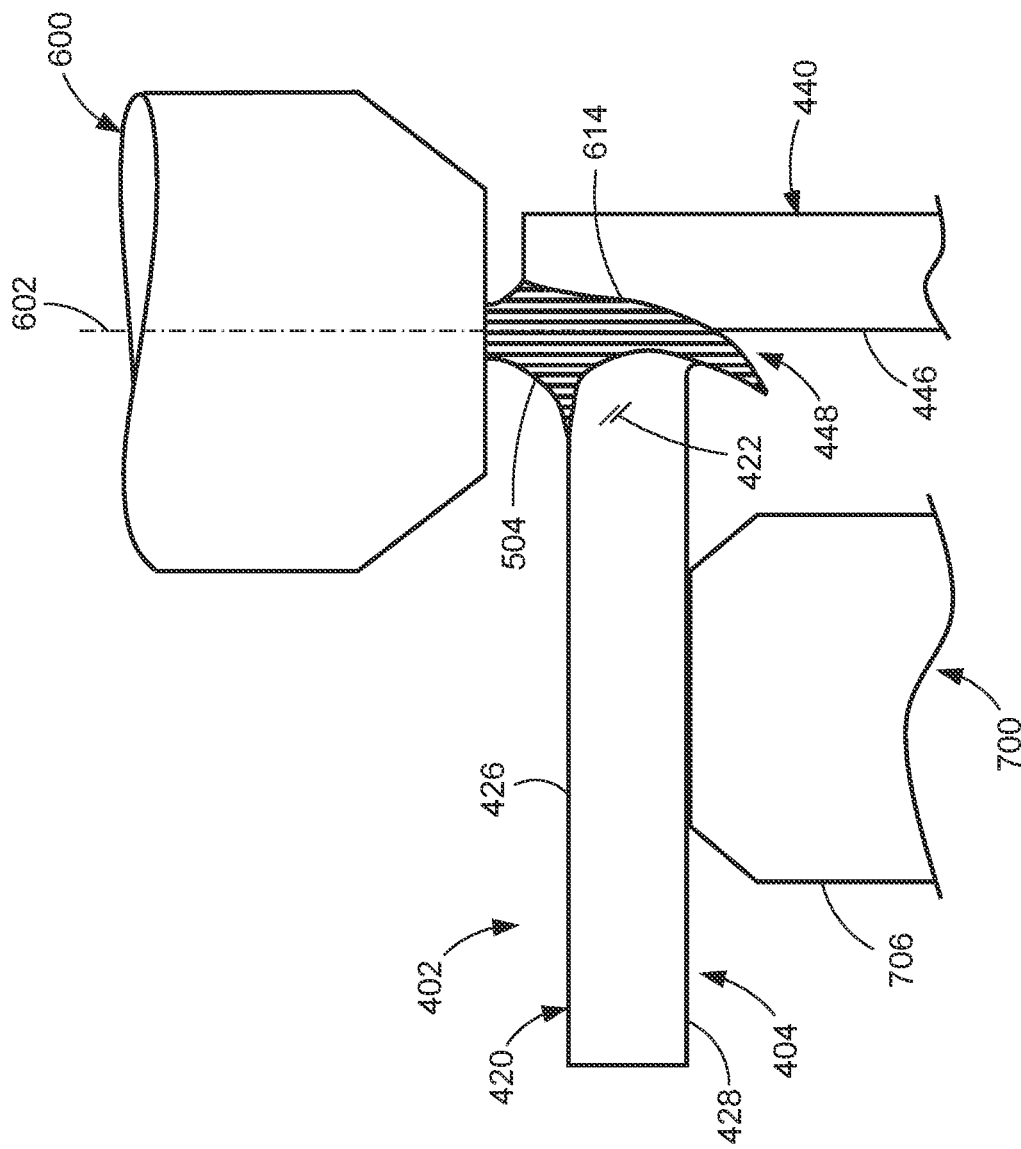
FIG. 15 is a sectional view taken along line 15-15 of FIG. 14, and illustrating an example of a plasma arc emanating from the PAW torch and simultaneously passing through the flange edge portion and the web side surface, and generating molten material that is deposited on a back side of the workpiece assembly during welding of the flange to the web.

Referring to FIG. 15, as the PAW torch 600 is moved along the interface 448 (FIG. 12), step 106 includes causing the plasma arc 614 to simultaneously pass through the flange edge portion 422 and the web side surface 446, as mentioned above. As the plasma arc 614 passes from the front side 402 to the back side 404 of the workpiece assembly 400, a weld pool 504 is created, and the bottom portion of the plasma arc 614 (i.e., the portion near the back side 404) tends to deviate laterally away from the torch axis 602. The deviation is represented by the plasma arc 614 exiting the interface 448 at the location of the flange back surface 428, as shown in FIG. 15.

Figure 16:
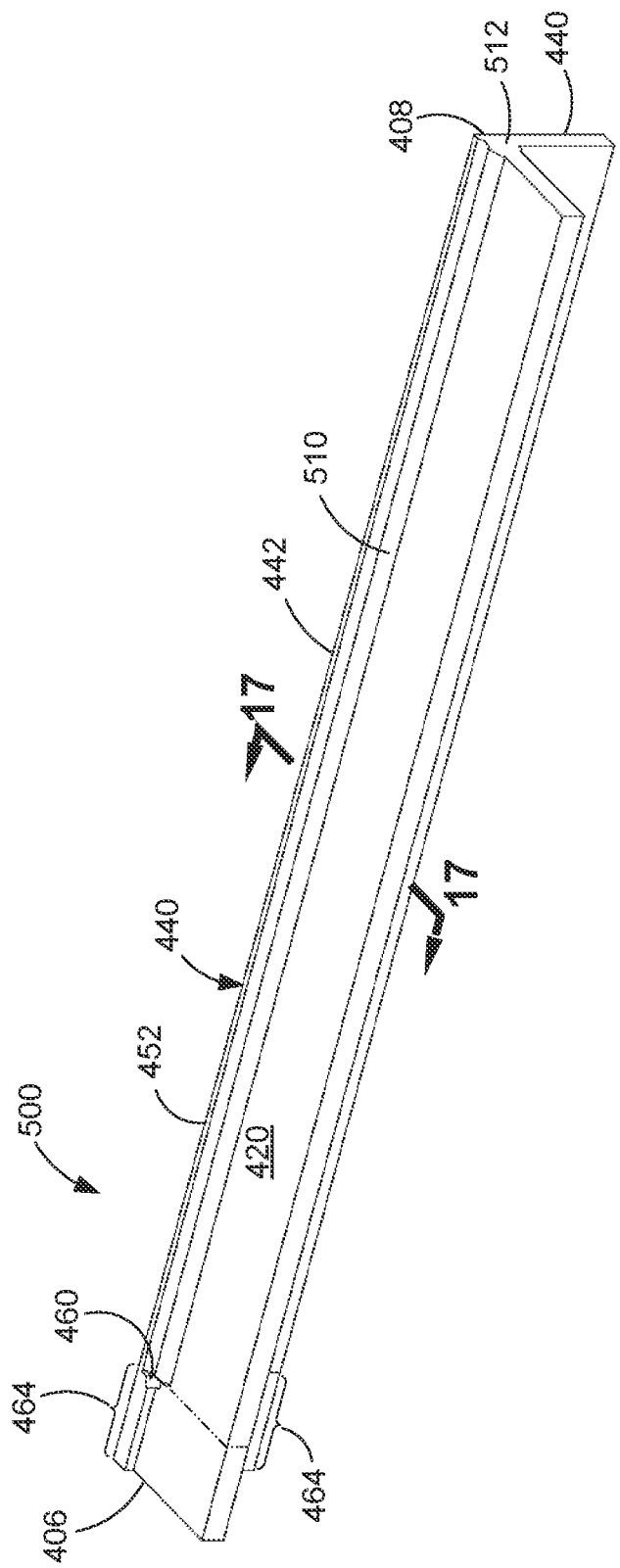
FIG. 16 is a perspective view of the welded assembly showing the flange welded to the web.

Referring to FIGS. 16-17, the molten material generated by the plasma arc 614 is a result of the melting of a portion of the web protrusion 452 and the melting of the flange edge portion 422. The resulting molten material forms a weld pool 504 that cools and forms a front side weld bead 510 along the length of the interface 448 on the front side 402 of the workpiece assembly 400. A back side fillet 512 is also formed between the flange back surface 428 and the web side surface 446 along the length of the interface 448 on the back side 404 of the workpiece assembly 400. In this manner, the plasma arc 614 welds the flange 420 to the web 440, resulting in a welded assembly 500.

Referring to FIG. 17, shown is a cross-sectional view of the welded assembly 500 showing the flange 420 joined to the web 440. Also shown is the front side weld bead 510, and the back side fillet 512. Within the weld joint, a weld nugget 506 is formed in the area where the plasma arc 614 (FIG. 15) passed through the flange 420 and web 440. The weld nugget 506 extends through the full thickness of the flange edge portion 422 and through the portion of the web 440 immediately adjacent to the flange 420. On opposite sides of the weld nugget 506 are heat-affected zones 508 in the flange 420 and in the web 440.

Also shown in FIG. 17 is a relatively small undercut 502 in the web edge surface 444. In this regard, step 106 of moving the PAW torch 600 includes forming the back side fillet 512 without undercutting the web edge portion 442 to a level below the flange front surface 426. For example, the method 100 includes positioning the flange 420 relative to the web 440 such that the web protrusion 452 is at a height that allows the plasma arc 614 (FIG. 15) to generate molten material without undercutting the web edge surface 444 to a level below the flange front surface 426. In some examples, the method 100 includes adjusting one or more process parameters (e.g., the travel speed and/or voltage level of the PAW torch 600) to form the back side fillet 512 at a size that is large enough to allow machining into a radius 522 in the final machined part 520.

Referring to FIG. 16, the method 100 may include forming the keyhole 460 at a distance of 1-3 inches from the first end 406 (or second end 408) of the workpiece assembly 400. The portion of the welded assembly 500 between the keyhole 460 and the first end 406 (or second end 408) is referred to as the runoff tab 464. The flange 420 and the web 440 each have a runoff tab 464. The runoff tab 464 represents the location of the welded assembly 500 where the flange 420 is non-welded to the web 440. The runoff tabs 464 of the flange 420 and the web 440 may be trimmed off of the welded assembly 500.

Referring to FIGS. 18-20, after welding the flange 420 to the web 440 two form the welded assembly 500, the method 100 may optionally include performing one or more post-processing operations on the welded assembly 500, such as stress relieving. The method 100 includes machining a radius 522 into the back side fillet 512 between the web 440 and the flange 420. The web protrusion 452 (FIG. 17) is such that the back side fillet 512 provides enough excess material to allow the radius 522 to be machined into the back side fillet 512. The radius 522 may be machined using a ball end cutter or other cutting tool. Additionally, the method 100 includes machining the welded assembly 500 to form a machined part 520. For example, the method includes machining the web side surfaces 446, the flange front surface 426, and the flange back surface 428 from an initial thickness 524, down to a final thickness 526. Other machining operations and/or post-processing operations may be performed on the machined part 520. For example, the machined part 520 may be subjected to passivating, and/or other operations. The machined part 520 may optionally be cut into relatively short segments (not shown) to form brackets for mounting components of various systems (e.g., hydraulic systems, electrical systems, etc.).

Advantageously, the presently-disclosed methods 100, 200, and 300 produce a welded assembly 500 that is a near-net-shape part requiring a significantly reduced amount of machining into a final machined part 520 relative to the amount of machining that would be required to produce the same machined part 520 from a solid billet (e.g., forged or extruded). In this regard, the methods 100, 200, and 300 provide a cost-saving solution for producing machined parts 520 from stock materials. Advantageously, the lead time for stock materials is relatively short in comparison to the long leads times typically required for billets.

Figure 21:
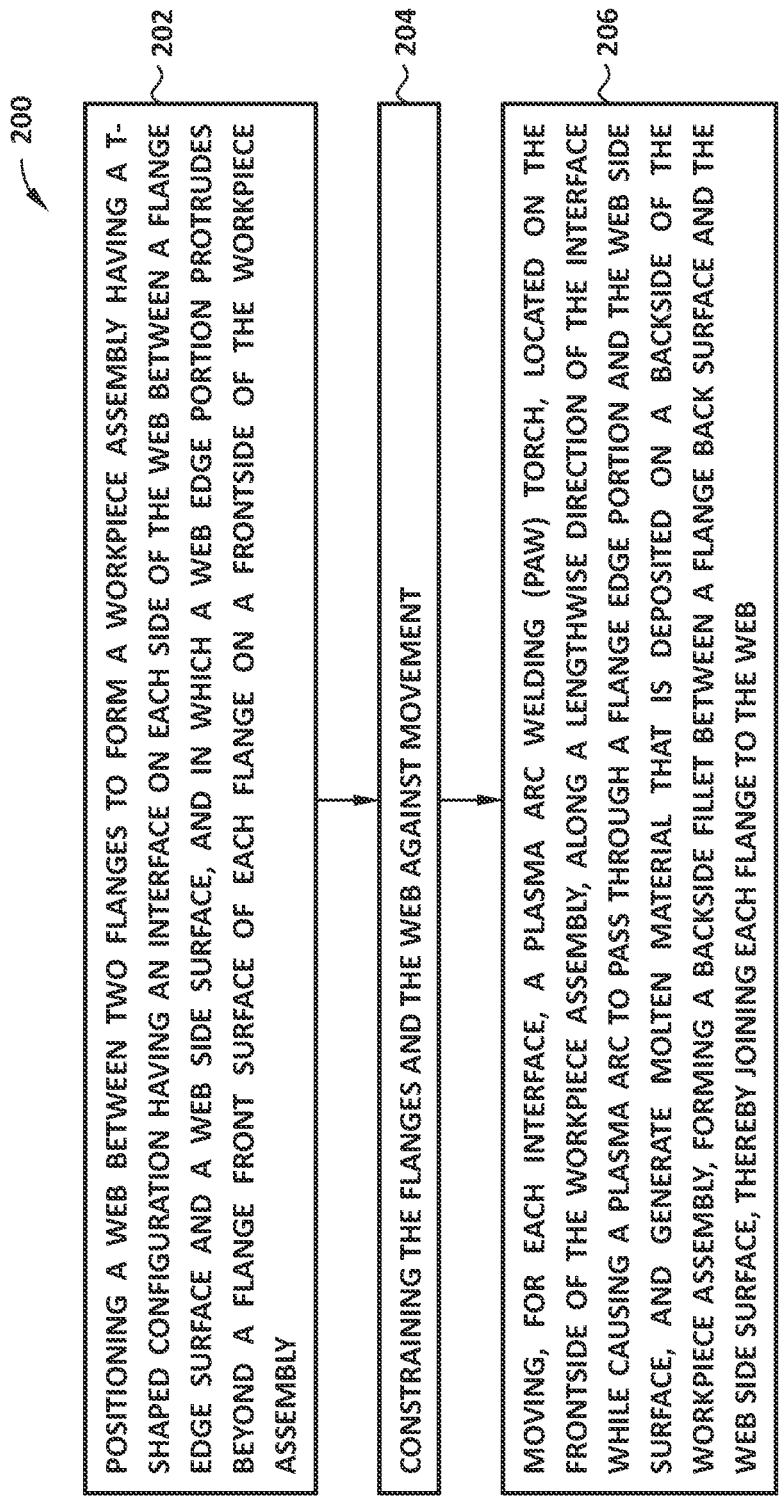
FIG. 21 is a flowchart of operations included in a method of welding a workpiece assembly having a T-shaped configuration.
Figure 22:
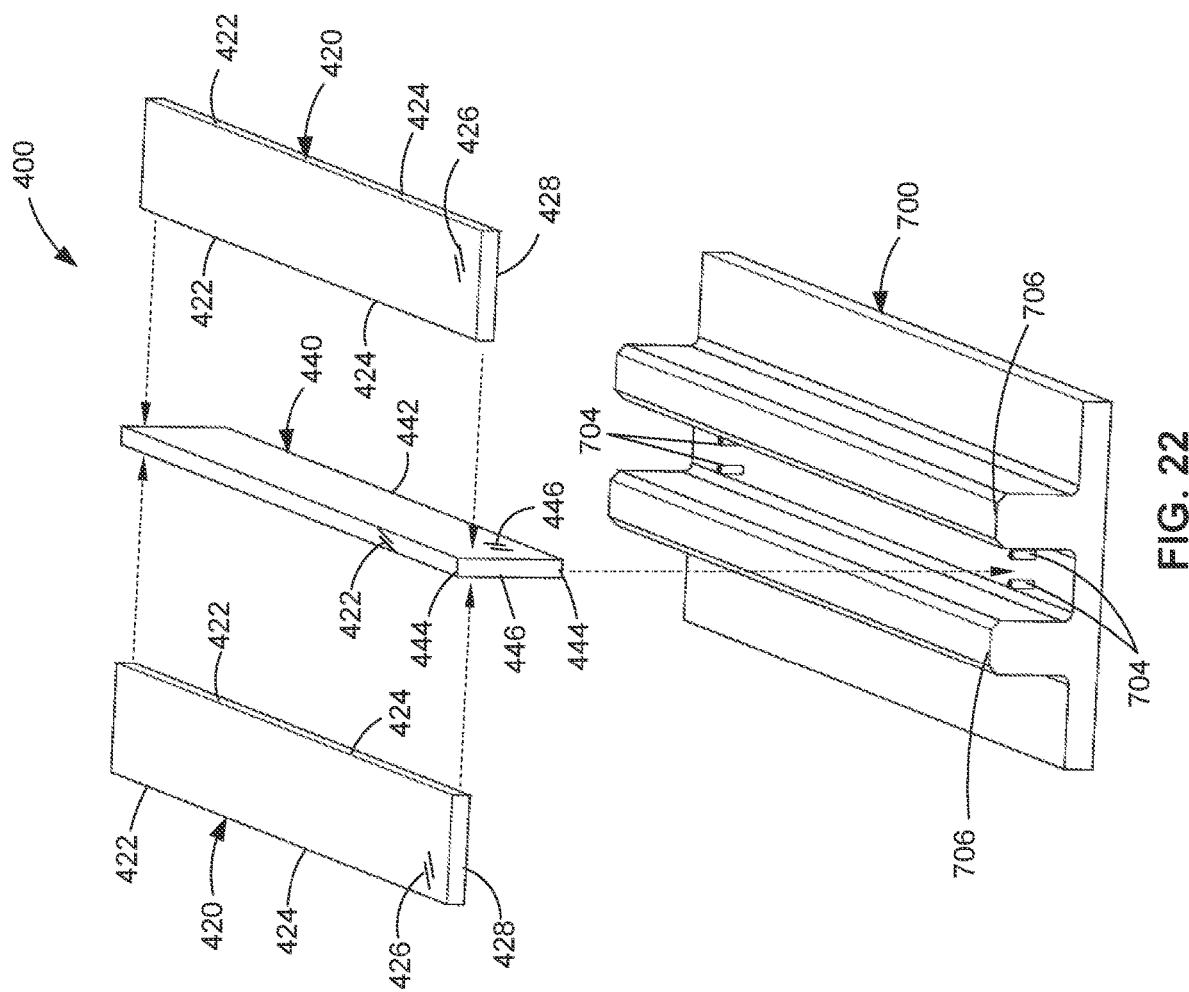
FIG. 22 is an exploded view of an example of a workpiece assembly comprising a pair of flanges and a web prior to mounting on a welding fixture.
Figure 23:
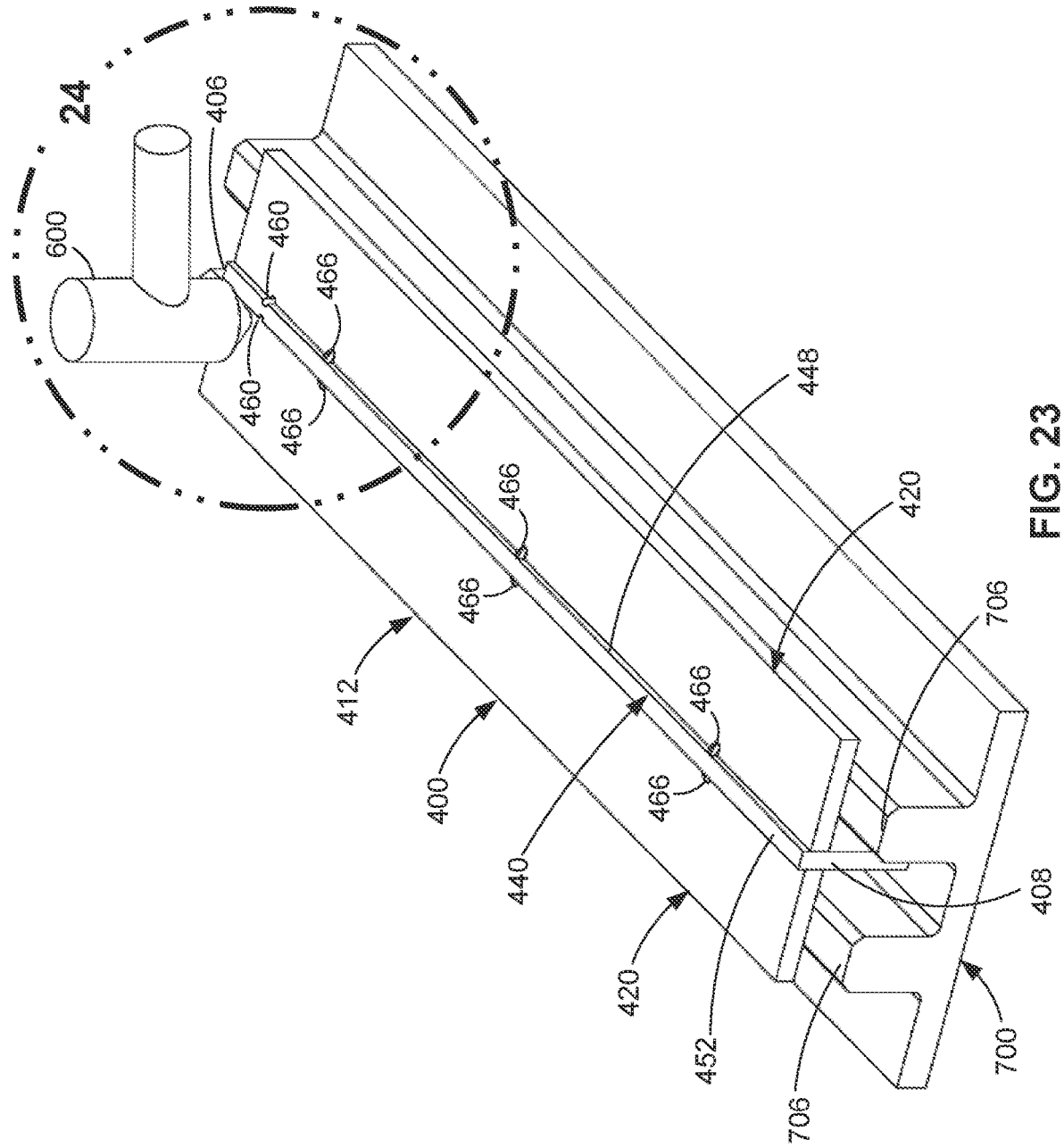
FIG. 23 shows the flanges and the web of FIG. 22 assembled into a T-shaped configuration and mounted on the welding fixture, and further illustrating a keyhole centered on the interfaces respectively on opposite sides side of the web, and also illustrating tack welds for fixing the flanges and the web in position during welding.

Referring to FIG. 21 with additional reference to FIGS. 22-30, shown in FIG. 21 is a flowchart of steps included in a method 200 of welding a workpiece assembly 400 (FIG. 23) having a T-shaped configuration 412 (FIG. 23). Any one or more of the above-described steps associated with welding the L-shaped configuration 410 of FIGS. 2-20 are applicable for the T-shaped configuration 412 of FIGS. 22-30. Likewise, any one or more of the below-described steps associated with welding the T-shaped configuration 412 are applicable for the L-shaped configuration 410.

Referring to FIGS. 22-25, step 202 of the method 200 includes positioning a web 440 between two flanges 420 to form a workpiece assembly 400 having the T-shaped configuration 412. Similar to the welding fixture 700 for the L-shaped configuration 410, the welding fixture 700 for the T-shaped configuration 412 may include a pair of flange tables 706 for respectively supporting the pair of flanges 420. In addition, the welding fixture 700 includes a plurality of vertically-extending pins 704 (FIG. 22) for positioning and orienting web 440. However, as indicated above, the welding fixture 700 may be provided in any one of a variety of alternative configurations, and is not limited to the arrangement shown in FIGS. 22-26.

Referring still to FIG. 22-25, the flanges 420 and the web 440 are formed of metallic material such as aluminum, steel, titanium, or other materials or alloys. Similar to the workpiece assembly 400 of the L-shaped configuration 410, the flanges 420 and the web 440 of the T-shaped configuration 412 may be comprised of off-the-shelf, constant-thickness plate stock. By using off-the-shelf materials, the presently-disclosed methods 100, 200, and 300 advantageously avoid most, if not all, operations required to prepare the web 440 or the flanges 420 for welding. For example, the presently-disclosed methods 100, 200, and 300 avoid the need for forming grooves, notches, or special edge geometry in the flanges 420 or web 440 prior to welding.

Figure 25:
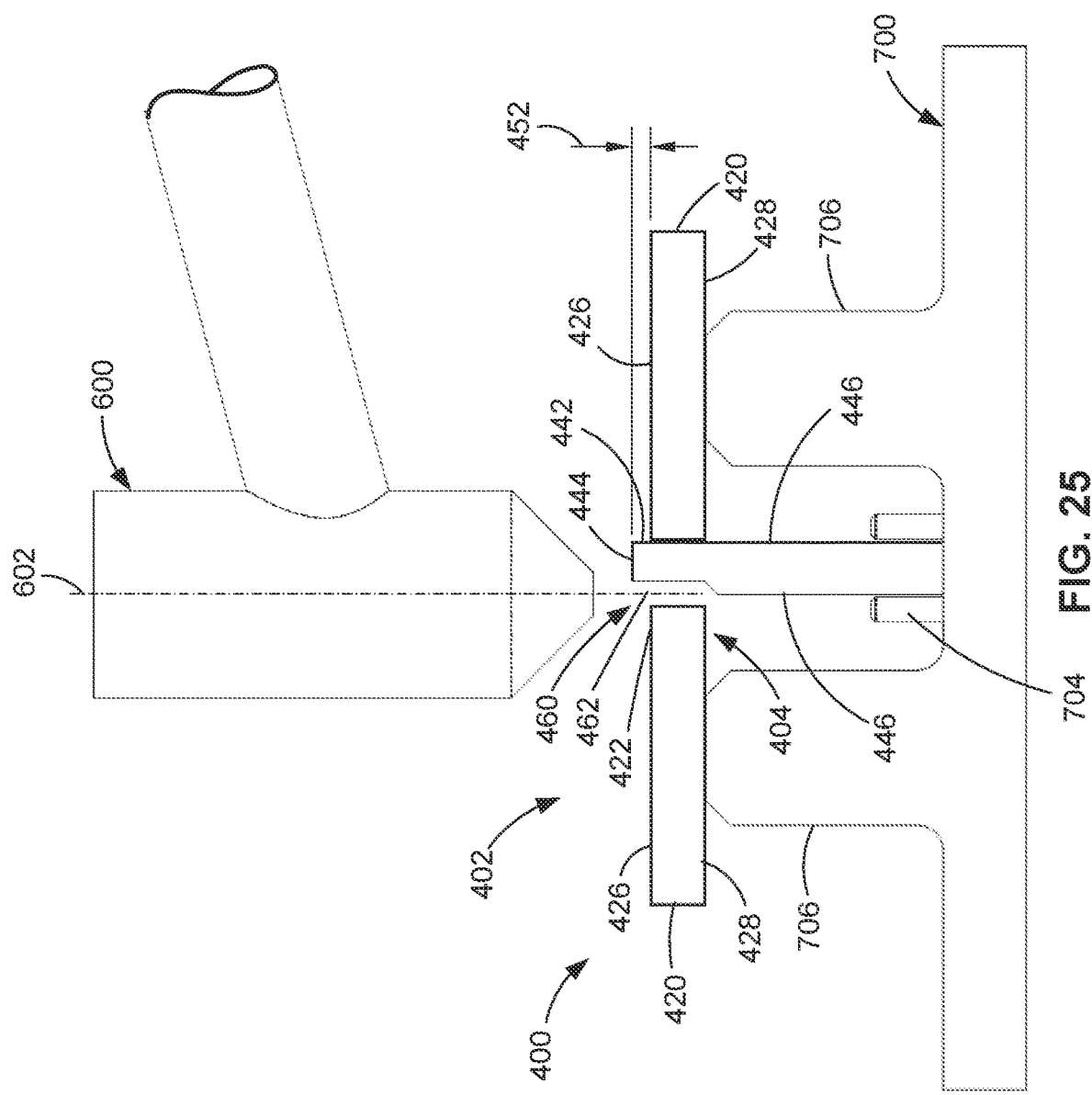
FIG. 25 is a sectional view taken along line 25-25 of FIG. 24, and illustrating the PAW torch centered on the keyhole centerline on one side of the web.
Figure 26:
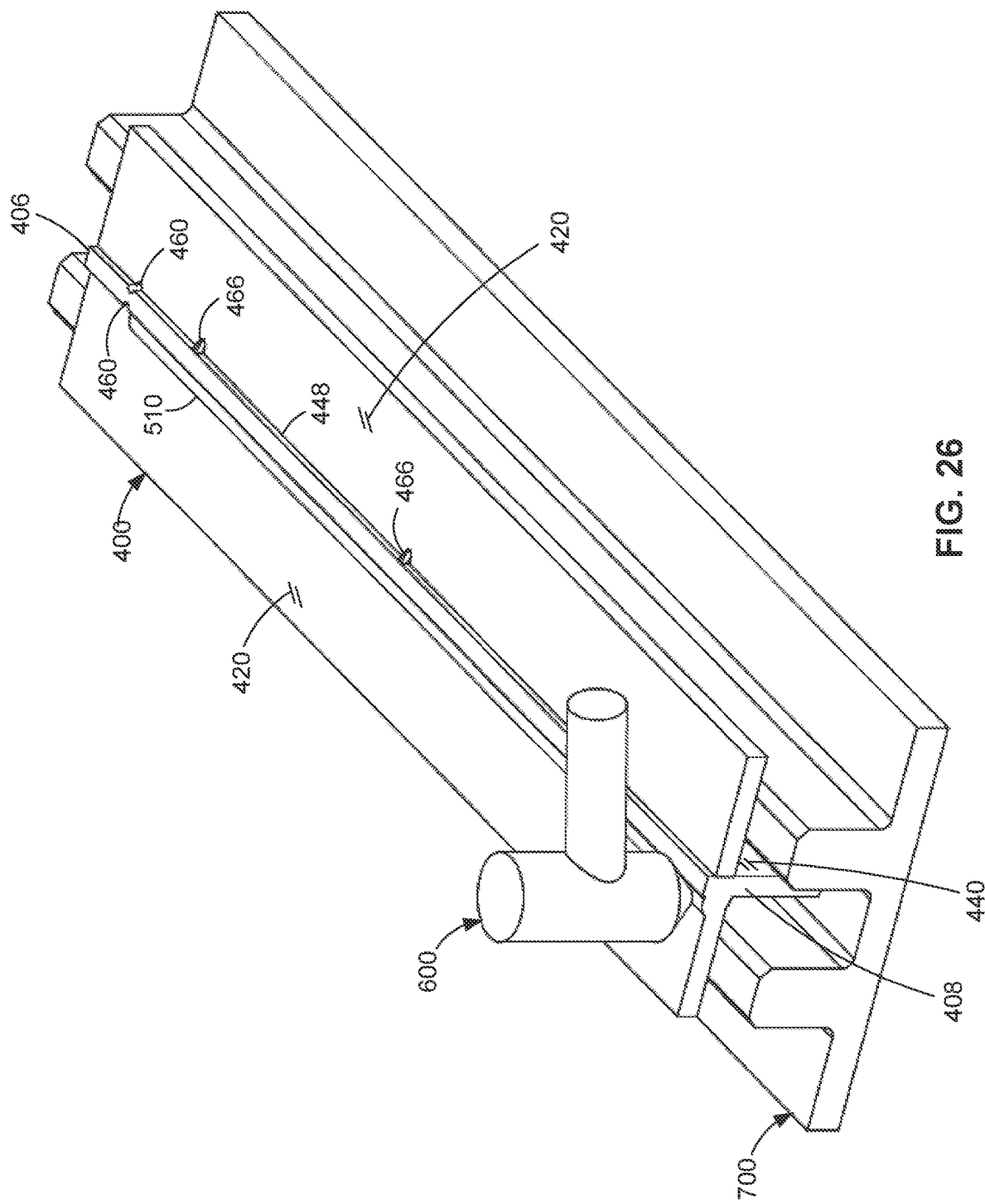
FIG. 26 is a perspective view of the workpiece assembly after the paw torch as welded one of the flanges to the web.

In the method 200, step 202 of positioning the web 440 between the flanges 420 comprises positioning each flange 420 such that the web edge surface 444 protrudes no more than 0.10 inch (e.g. more preferably 0.080 inch) beyond the flange front surface 426. FIG. 25 shows an example of a web protrusion 452 above the flange front surface 426 on each side of the web 440. Step 202 positioning the web 440 between the flanges 420 additionally includes positioning each flange 420 such that, along the interface 448 on each side of the web 440, the flange edge surface 424 is no more than 0.040 inch from the web side surface 446. In an example not shown, step 202 of positioning the web 440 between the flanges 420 comprises orienting each flange 420 such that the flange angle 430 of the flange front surface 426 (or flange back surface 428) is non-perpendicular to the web side surface 446. Similar to the above-described arrangement shown in FIGS. 6-7, the T-shaped configuration 412 may be supported on a welding fixture 700 in a manner such that each flange 420 is oriented to within 45 degrees of perpendicular to the web 440.

Step 204 of the method 200 includes constraining the flanges 420 and the web 440 against movement. Similar to the above-described method 100 for welding the L-shaped configuration 410, the method 200 includes constraining the T-shaped configuration 412 while moving the PAW torch 600 along the interface 448 on each side of the web 440. The step of constraining the flanges 420 and the web 440 of the T-shaped configuration 412 against movement comprises supporting the workpiece assembly 400 in a welding fixture 700. As mentioned above, the welding fixture 700 may include one or more mechanisms (not shown) for fixedly clamping the flanges 420 and the web 440 against movement.

Figure 24:
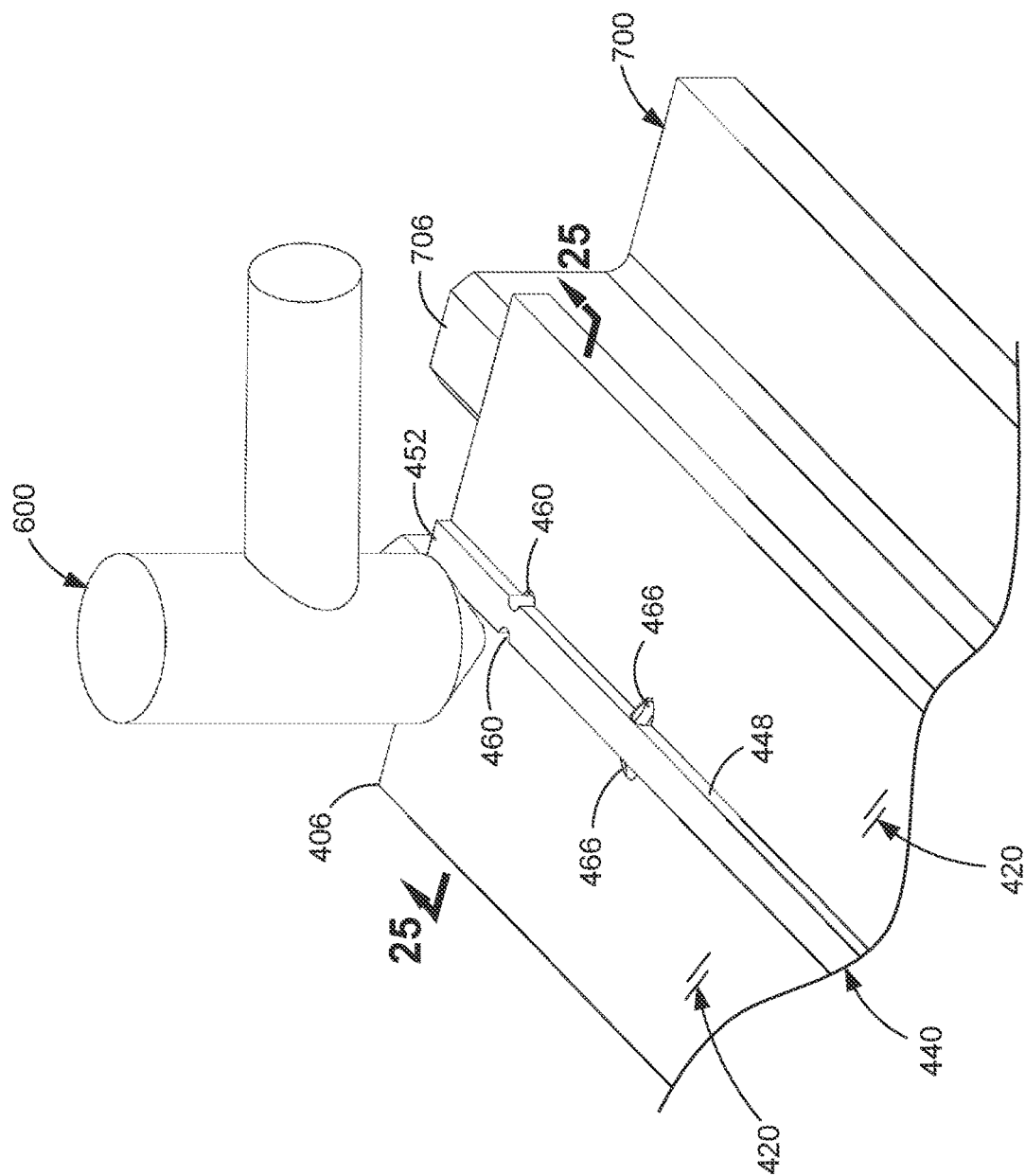
FIG. 24 is a magnified view of the portion of the weld assembly identified by reference numeral 24 of FIG. 23, and illustrating an example of a PAW torch centered on one of the keyhole's on one side of the web.

Referring to FIGS. 23-24, the step of constraining the flanges 420 and the web 440 against movement comprises tack welding each flange 420 to the web 440 at one or more tack weld 466 locations along the interface 448. As described above with regard to the L-shaped configuration 410, the welded assembly 500 shown in FIGS. 23-25 includes one or more tack welds 466 located at spaced intervals along the length of the workpiece assembly 400.

Referring to FIGS. 23-25, the method 200 includes forming a keyhole 460 centered on each interface 448 and located proximate an end of the workpiece assembly 400. In the example shown keyholes 460 on each side of the web 440 are located at the same end (i.e., the first end 406) of the workpiece assembly 400. However, in other examples, the keyhole 460 on one side of the web 440 may be located at the first end 406 of the workpiece assembly 400, and the keyhole 460 on the opposite side of the web 440 may be located at the second end 408 of the workpiece assembly 400. As described above with regard to the L-shaped configuration 410, the keyhole centerline 462 may be centered on the interface 448 such that one half of the keyhole 460 extends into the flange 420, and the other half of the keyhole 460 extends partially into the web side surface 446, as shown in FIG. 25.

As shown in FIG. 24-28, the method 200 includes starting the PAW torch 600 movement along each interface 448, with the plasma arc 614 inside the keyhole 460, such as is shown in FIG. 13. Step 206 of the method 200 includes moving, for each interface 448, the PAW torch 600 along the lengthwise direction of the interface 448 while causing the plasma arc 614 (e.g., FIG. 15) to simultaneously pass through the flange edge portion 422 and the web side surface 446, and generate molten material that is deposited on the back side 404 of the workpiece assembly 400, and thereby forming a back side fillet 512 between the flange back surface 428 and the web side surface 446. Step 206 may include centering the torch axis 602 on the interface 448 and maintaining the torch axis 602 approximately parallel (e.g., within 10 degrees) to the web side surface 446. After moving the PAW torch 600 along the interface 448 one side of the web 440, the welding process is repeated along the interface 448 on the opposite side of the web 440, thereby joining both flanges 420 to the web 440, and resulting in a welded assembly 500 in the T-shaped configuration 412.

Figure 27:
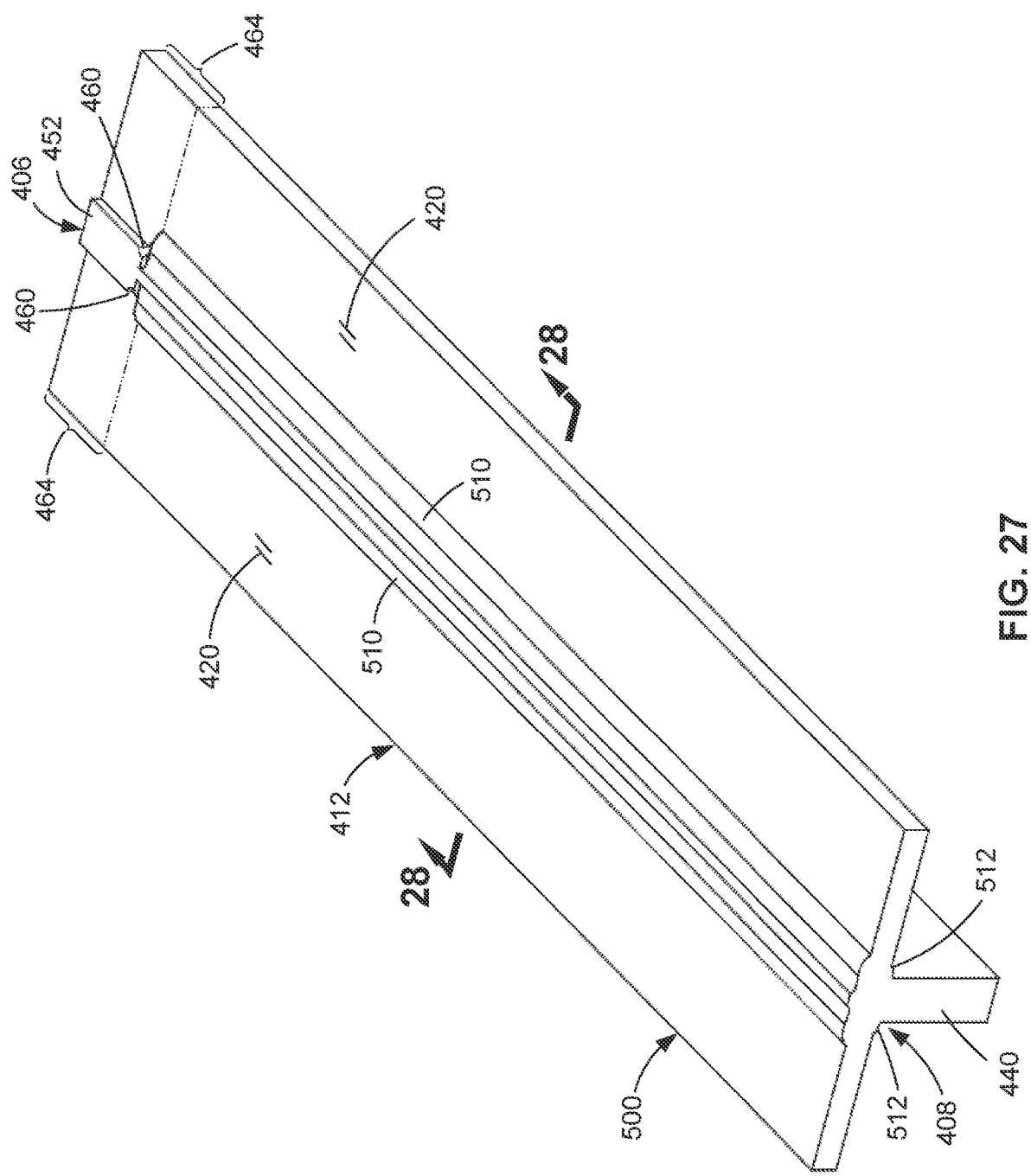
FIG. 27 is a perspective view of the workpiece assembly of FIG. 26 after both flanges have been welded to the web.

Referring to FIG. 27, similar to the L-shaped configuration 410, runoff tabs 464 are defined on each side of the web 440 between the keyhole 460 and the first end 406 (or second end 408). The runoff tabs 464 of the flanges 420 and the web 440 represents locations where the flanges 420 are non-welded to the web 440. The runoff tabs 464 may be trimmed off of the welded assembly 500.

Figure 28:
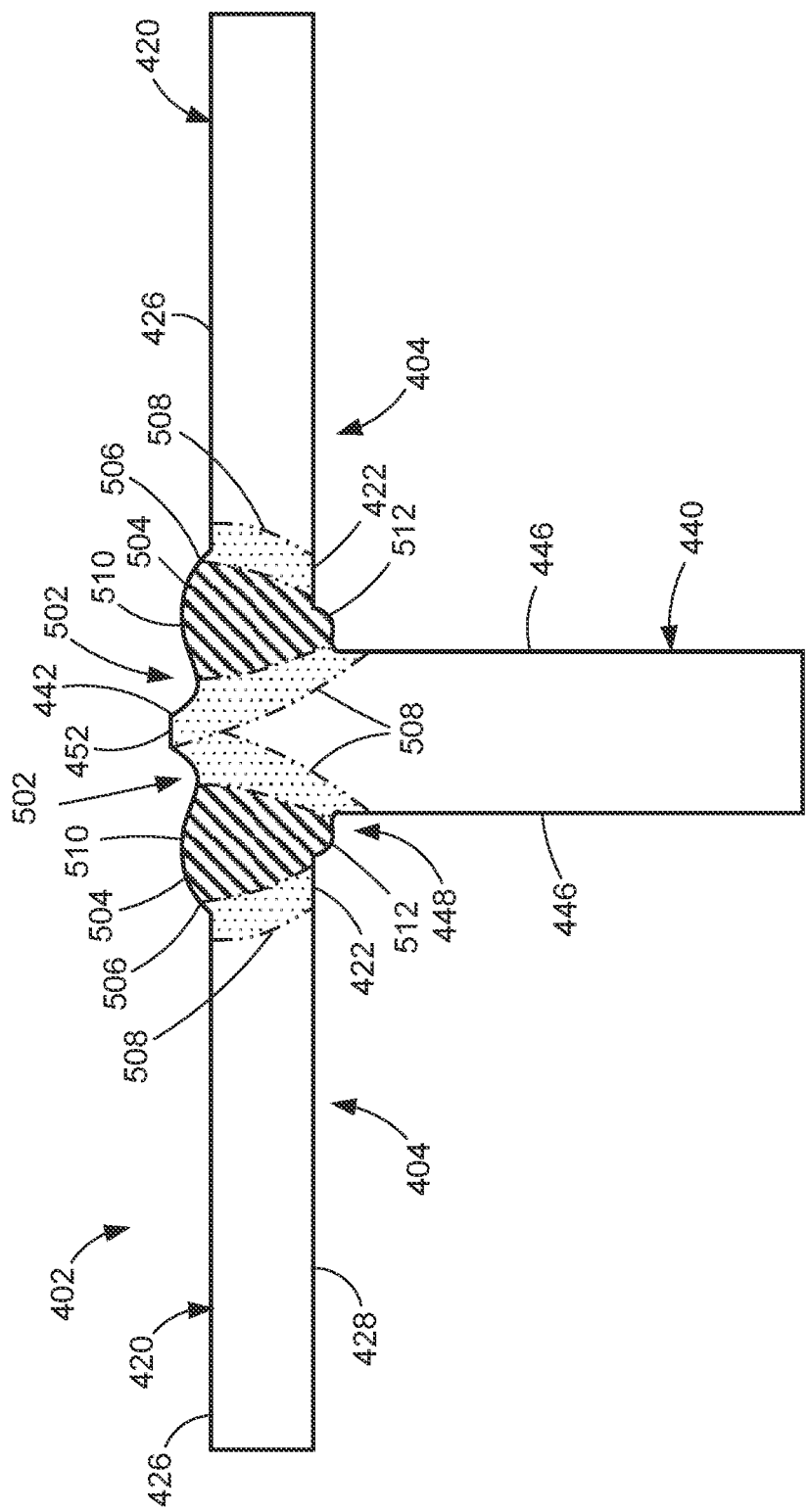
FIG. 28 is a sectional view taken along line 28-28of FIG. 27, and illustrating the weld nugget on each side of the web respectively joining the flange to the web.

FIG. 28 is a cross-sectional view of the welded assembly 500, showing each flange 420 joined to the web 440, with the front side weld bead 510 on the front side 402, and the back side fillet 512 on the back side 404 of the welded assembly 500. On each of opposing sides of the web 440, a weld nugget 506 is formed between the flange 420 and the web 440, as a result of the welding operation. Each weld nugget 506 is continuous through the thickness of the weld joint, and joins the flange 420 to the web 440. Heat-affected zones 508 are located on opposite sides of each weld nugget 506.

Figure 29:
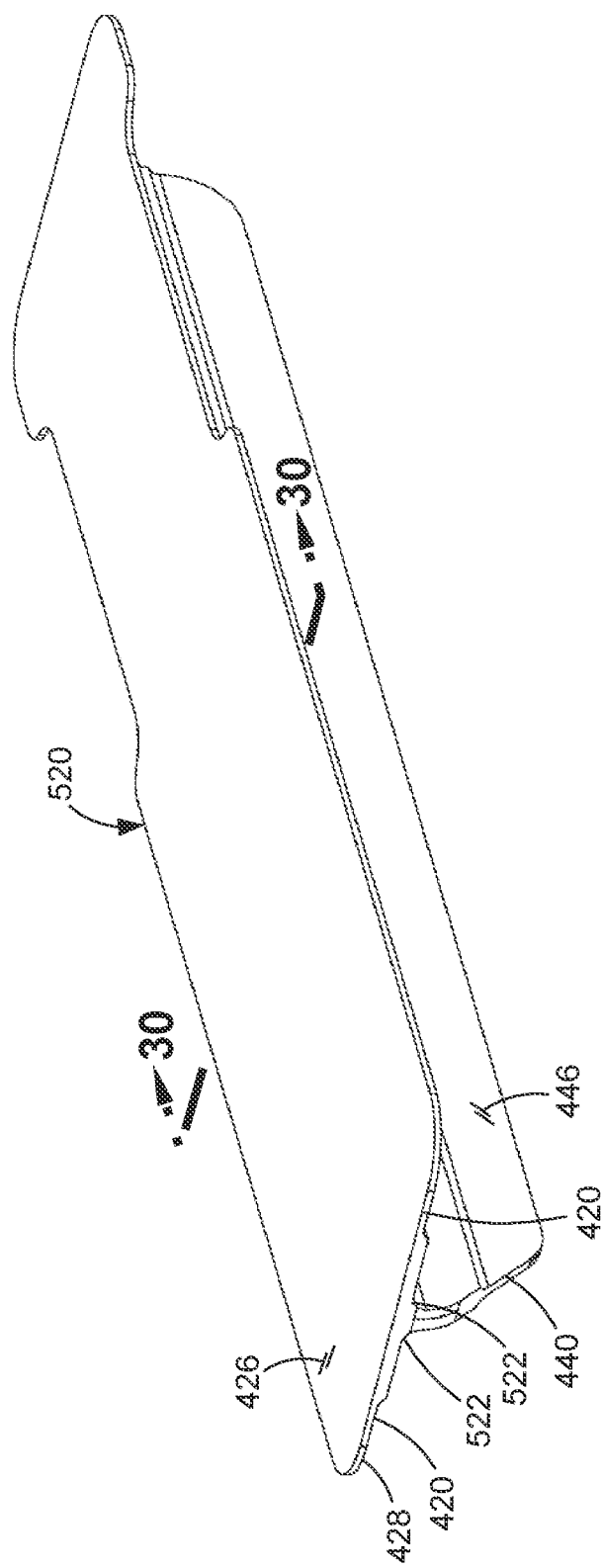
FIG. 29 is a perspective view of an example of the welded assembly of FIGS. 27-28 after machining to result in a machined part.
Figure 30:
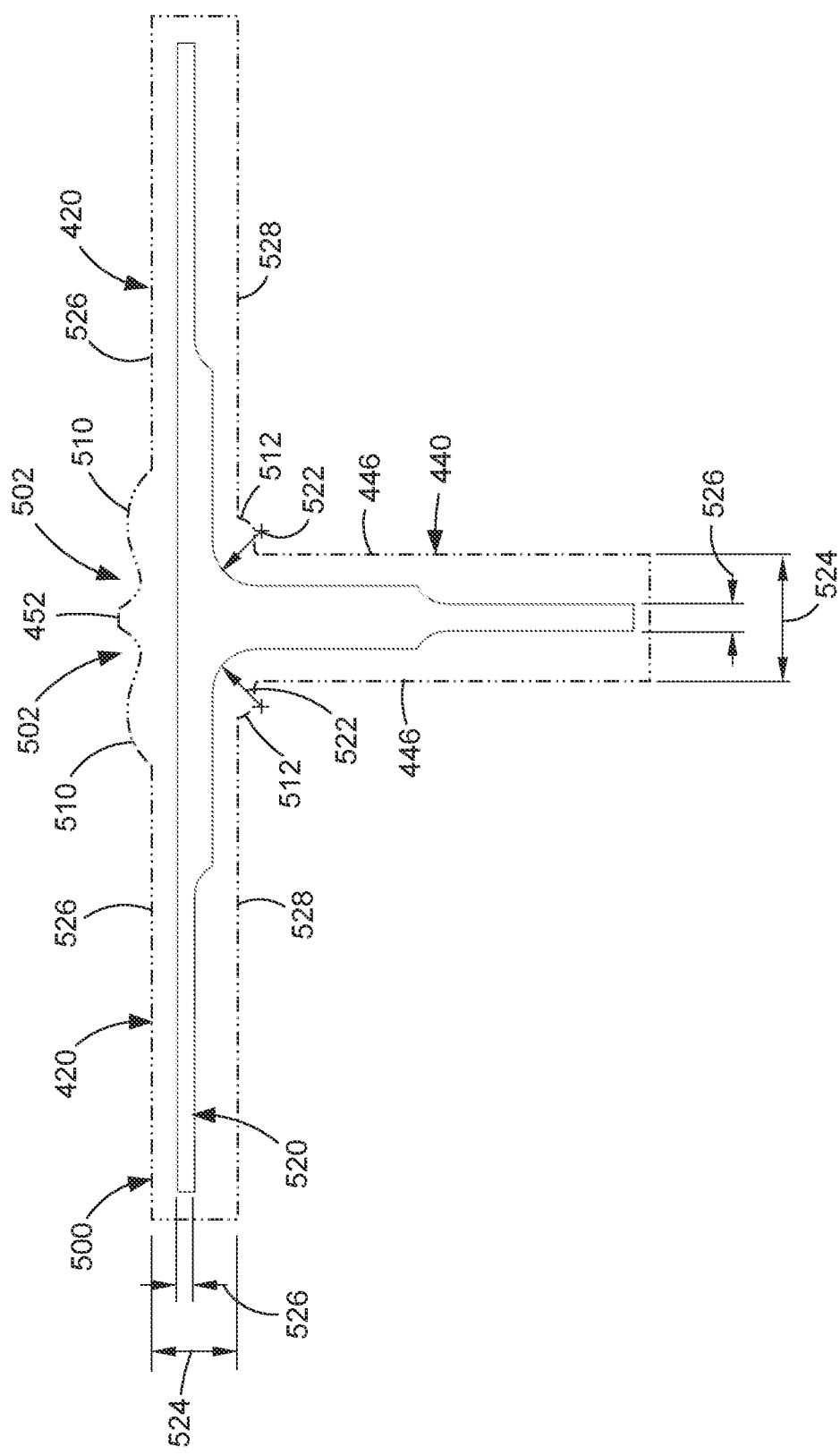
FIG. 30 is a sectional view taken along line 30-30 of FIG. 29, and illustrating the final thicknesses of the flanges and web after machining of the welded assembly.

Referring to FIGS. 28-30, after the flanges 420 have been welded to the web 440, the method 200 includes machining a radius 522 into the back side fillet 512 between the web 440 and each of the flanges 420. The method 200 additionally includes machining the web side surfaces 446, the flange front surface 426, and the flange back surface 428 of each flange 420 from an initial thickness 524 down to a final thickness 526. As mentioned above for the L-shaped configuration 410, the welded assembly 500 resulting from steps 202, 204 and 206 of method 200 is a near-net-shape part that significantly reduces the amount of machining for producing a final machined part 520.

Figure 31:
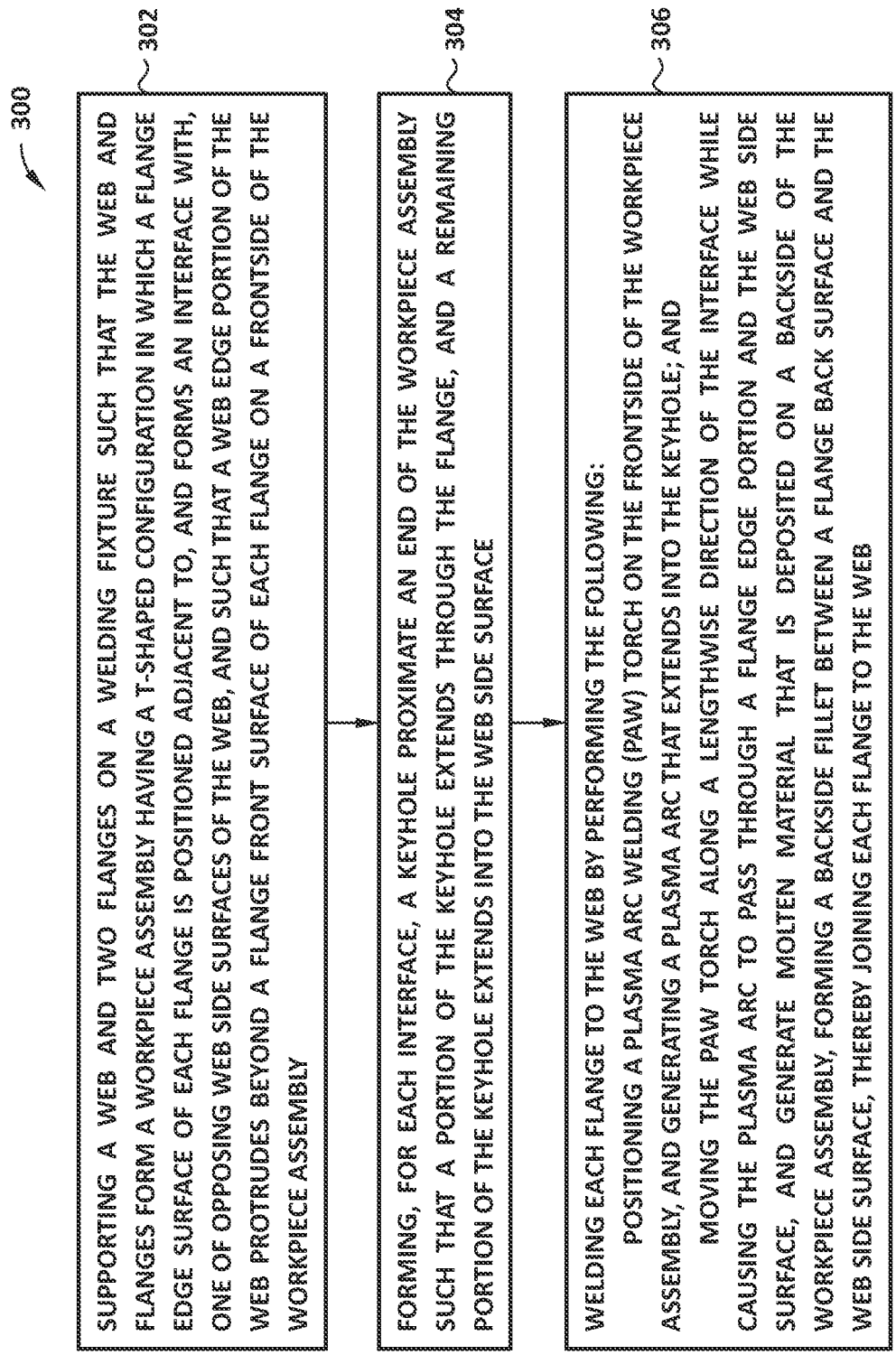
FIG. 31 is a flowchart of operations included in a method of welding a workpiece assembly.

Referring to FIG. 31, shown is a flowchart of steps included in an additional method 300 of welding a workpiece assembly 400 in a T-shaped configuration 412. The method 300 is similar in scope to the method 200, and includes any one or more of the above-described steps of welding the L-shaped configuration 410 of FIGS. 2-20, and/or any one or more of the above-described steps of welding the T-shaped configuration 412 of FIGS. 22-30.

Step 302 of the method 300 includes supporting a web 440 and two flanges 420 on a welding fixture 700, such that the web 440 and flanges 420 form a workpiece assembly 400 having a T-shaped configuration 412 when the workpiece assembly 400 is viewed from either end, as shown in FIG. 25. As mentioned above, each flange 420 is positioned such that the flange edge surface 424 of is positioned adjacent to, and forms an interface 448 with, one of opposing web side surfaces 446 of the web 440, and such that the web edge portion 442 of the web 440 protrudes beyond the flange front surface 426 on the front side 402 of the workpiece assembly 400. The method 300 additionally includes constraining the flanges 420 and the web 440 against movement, at least while moving the PAW torch 600 along each interface 448. The flanges 420 and the web 440 may be constrained via the welding fixture 700, and/or via tack welds 466 fixing the flanges 420 to the web 440.

Step 304 of the method 300 includes forming, for each interface 448, a keyhole 460 proximate an end of the workpiece assembly 400 such that a portion (e.g., one half) of the keyhole 460 extends through the flange 420, and the remaining portion (e.g., the other half) of the keyhole 460 extends into the web side surface 446. For example, as described above, each keyhole 460 is positioned such that one semi-cylindrical portion of the keyhole 460 is located on the flange edge portion 422, and the other semi-cylindrical portion of the keyhole 460 extends through a portion of the web 440. Each keyhole 460 is centered on the interface 448. For examples where there is a gap 450 between the flange edge surface 424 and the web side surface 446, the keyhole 460 is centered on the gap 450.

Step 306 of the method 300 includes sequentially welding each flange 420 to the web 440 by positioning the PAW torch 600 on the front side 402 of the workpiece assembly 400, and generating a plasma arc 614 that extends into the keyhole 460, followed by moving the PAW torch 600 along the lengthwise direction of the interface 448 while centering the torch axis 602 on the interface 448 and maintaining the torch axis 602 approximately parallel to (e.g., within 10 degrees) to the web side surface 446. The PAW torch 600 is moved along each interface 448 while causing the plasma arc 614 to pass through the flange edge portion 422 and the web side surface 446 from the front side 402 to the back side 404 of the workpiece assembly 400, and generate molten material that is deposited on the back side 404 of the workpiece assembly 400, forming a back side fillet 512 between the flange back surface 428 and the web side surface 446.

Although the figures illustrate the welding of an L-shaped configuration 410 and a T-shaped configuration 412, the method 300 can be implemented for welding other configurations. For example, the method 300 may be implemented for forming a welded assembly 500 having an I-shaped configuration that may be machined into an I-beam. To produce an I-shaped configuration, a pair of flanges 420 may be welded to each of the opposing web edge portions 442

(e.g., the upper web edge portion 442 and the lower web edge portion 442) of a vertically-oriented web 440.

Many modifications and other examples of the disclosure will come to mind to one skilled in the art to which this disclosure pertains having the benefit of the teachings presented in the foregoing descriptions and the associated drawings. The examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of welding a workpiece assembly, comprising the steps of:
    positioning a flange adjacent to a web to form a workpiece assembly having an interface between a flange edge surface and a web side surface, and in which a web edge portion protrudes beyond a flange front surface on a front side of the workpiece assembly;
    constraining the flange and the web against movement; and
    moving a plasma arc welding (PAW) torch, located on the front side of the workpiece assembly, along a lengthwise direction of the interface, while causing a plasma arc to pass through a flange edge portion and the web side surface and generate molten material that forms a front side weld bead between the flange front surface and the web side surface on the front side of the workpiece assembly and forms a back side fillet between a flange back surface and the same web side surface on a back side of the workpiece assembly, to thereby join the flange to the web.

2. The method of claim 1, wherein the step of moving the PAW torch includes:
    forming the back side fillet without undercutting the web edge portion to a level below the flange front surface.

3. The method of claim 1, wherein the step of positioning the flange adjacent to the web comprises:
    positioning the flange such that the web edge surface protrudes no more than 0.10 inch beyond the flange front surface.

4. The method of claim 1, wherein the step of positioning the flange adjacent to the web comprises:
    positioning the flange such that, along the interface, the flange edge surface is no more than 0.040 inch from the web side surface.

5. The method of claim 1, wherein the step of positioning the flange adjacent to the web comprises:
    orienting the flange to within 45 degrees of perpendicular to the web.

6. The method of claim 1, further comprising the steps of:
    forming a keyhole centered on the interface and located proximate an end of the workpiece assembly; and
    starting the PAW torch movement with the plasma arc in the keyhole.

7. The method of claim 6, wherein the step of forming the keyhole comprises:
    forming the keyhole at a diameter of between 0.25 to 0.5 inch.

8. The method of claim 1, wherein the step of constraining the flange and the web against movement comprises:
    supporting the workpiece assembly in a welding fixture.

9. The method of claim 1, wherein the step of constraining the flange and the web against movement comprises:
    tack welding the flange to the web at one or more locations along the interface.

10. The method of claim 1, wherein the step of moving the PAW torch comprises:
    moving the PAW torch either manually or via a robotic device.

11. The method of claim 1, wherein after joining the flanges to the web, performing at least one of the following steps:
    machining a radius into a back side fillet between the web and the flange;
    machining the web side surfaces, the flange front surface, and a flange back surface from an initial thickness down to a final thickness.

12. The method of claim 1, wherein the flange and the web are comprised of one of the following materials: titanium, aluminum, steel, or any combination thereof.

13. The method of claim 1, wherein the flange and the web are comprised of constant-thickness plate stock prior to being joined via the PAW torch.

14. A method of welding a workpiece assembly, comprising the steps of:
    positioning a web between two flanges to form a workpiece assembly having a T-shaped configuration having an interface on each side of the web between a flange edge surface and a web side surface, and in which a web edge portion protrudes beyond a flange front surface of each flange on a front side of the workpiece assembly;
    constraining the flanges and the web against movement; and
    moving, for each interface, a plasma arc welding (PAW) torch, located on the front side of the workpiece assembly, along a lengthwise direction of the interface while causing a plasma arc to pass through a flange edge portion and the web side surface, and generate molten material that forms a front side weld bead between the flange front surface and the web side surface on the front side of the workpiece assembly and forms a back side fillet between a flange back surface and the same web side surface on a back side of the workpiece assembly, thereby joining each flange to the web.

15. The method of claim 14, wherein the step of positioning the web between the flanges comprises:
    positioning each flange such that the web edge surface protrudes no more than 0.10 inch beyond the flange front surface.

16. The method of claim 14, further comprising the steps of:
    forming a keyhole centered on each interface and located proximate an end of the workpiece assembly; and
    starting the PAW torch movement along each interface with the plasma arc inside the keyhole.

17. The method of claim 14, wherein the step of constraining the flanges and the web against movement comprises:
    tack welding each flange to the web at one or more locations along the interface.

18. The method of claim 14, wherein the step of moving the PAW torch along each interface comprises:

centering a torch axis of the PAW torch on the interface, and maintaining the torch axis approximately parallel to the web side surface.

19. A method of welding a workpiece assembly, comprising the steps of:

supporting a web and two flanges on a welding fixture such that the web and flanges form a workpiece assembly having a T-shaped configuration in which a flange edge surface of each flange is positioned adjacent to, and forms an interface with, one of opposing web side surfaces of the web, and such that a web edge portion of the web protrudes beyond a flange front surface of each flange on a front side of the workpiece assembly;

forming, for each interface, a keyhole proximate an end of the workpiece assembly such that a portion of the keyhole extends through the flange, and a remaining portion of the keyhole extends into one of the web side surfaces;

welding each flange to the web by performing the following:

positioning a plasma arc welding (PAW) torch on the front side of the workpiece assembly, and generating a plasma arc that extends into the keyhole; and moving the PAW torch along a lengthwise direction of the interface while causing the plasma arc to pass through a flange edge portion and the web side surface, and generate molten material that forms a front side weld bead between the flange front surface and the web side surface on the front side of the workpiece assembly and forms a back side fillet between a flange back surface and the same web side surface on a back side of the workpiece assembly, thereby joining each flange to the web.

20. The method of claim 1, wherein the step of moving the PAW torch along the interface comprises:

forming a weld nugget in an area where the plasma arc passes through the flange and the web.

\* \* \* \* \*